(12) United States Patent
Sasaki et al.

(10) Patent No.: US 12,220,951 B2
(45) Date of Patent: Feb. 11, 2025

(54) PNEUMATIC TIRE

(71) Applicant: Sumitomo Rubber Industries, Ltd., Hyogo (JP)

(72) Inventors: Tatsuya Sasaki, Kobe (JP); Tsukasa Yano, Kobe (JP); Rena Onitsuka, Kobe (JP); Masaki Terashima, Kobe (JP); Yusuke Sueyoshi, Kobe (JP); Hiroyuki Nakayama, Kobe (JP); Junya Sueno, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 21 days.

(21) Appl. No.: 18/474,884

(22) Filed: Sep. 26, 2023

(65) Prior Publication Data

US 2024/0131866 A1 Apr. 25, 2024
US 2024/0227446 A9 Jul. 11, 2024

(30) Foreign Application Priority Data

Oct. 21, 2022 (JP) .................................. 2022-168895
Oct. 21, 2022 (JP) .................................. 2022-168896
(Continued)

(51) Int. Cl.
*B60C 5/14* (2006.01)
*B60C 3/04* (2006.01)
(Continued)

(52) U.S. Cl.
CPC .................. B60C 3/04 (2013.01); B60C 5/14 (2013.01); B60C 11/0083 (2013.01);
(Continued)

(58) Field of Classification Search
CPC ....... B60C 3/04; B60C 11/0083; B60C 11/01; B60C 5/14
See application file for complete search history.

(56) References Cited

U.S. PATENT DOCUMENTS

| | | | | |
|---|---|---|---|---|
| 6,073,668 A | * | 6/2000 | Iwasaki | B60C 11/01 |
| | | | | 152/454 |
| 2017/0057302 A1 | * | 3/2017 | Makino | B60C 3/04 |
| 2019/0315160 A1 | * | 10/2019 | Yamamoto | B60C 11/01 |

FOREIGN PATENT DOCUMENTS

| | | | | |
|---|---|---|---|---|
| DE | 102013103077 A1 | * | 10/2014 | B60C 1/0008 |
| JP | 2013-060129 A | | 4/2013 | |

OTHER PUBLICATIONS

Machine translation: DE-102013103077-A1, Guardalabene J, (Year: 2024).*

* cited by examiner

*Primary Examiner* — Kendra Ly

(74) *Attorney, Agent, or Firm* — Studebaker & Brackett PC

(57) ABSTRACT

A pneumatic tire comprises: a tread portion having a ground contacting surface; a sidewall portions having an outer surface; a bead portions; a carcass extending between the bead portions; and an inner rubber extending between bead portions. The inner rubber comprises a first portion extending through the tread portion with a first thickness t1, and a second portion extending through the sidewall portion with a second thickness t2. The first thickness t1 is more than the second thickness t2. In a meridian cross section of the tire under its normal state, when a first reference point (Pb1), a second reference point (Pb2), a shoulder reference point (Ps), a reference line segment (Lb), and a shoulder line segment (Ls) are defined, then a length (L1) of the shoulder line segment (Ls) is 85.9% to 89.3% of a length (L2) of the reference line segment (Lb).

20 Claims, 14 Drawing Sheets

(30) Foreign Application Priority Data

Oct. 21, 2022 (JP) .................................. 2022-168898
Oct. 21, 2022 (JP) .................................. 2022-168900

(51) Int. Cl.
*B60C 11/00* (2006.01)
*B60C 11/01* (2006.01)
*B60C 9/04* (2006.01)
*B60C 11/03* (2006.01)
*B60C 13/00* (2006.01)
*B60C 13/02* (2006.01)
*B60C 15/00* (2006.01)

(52) U.S. Cl.
CPC ...... *B60C 11/01* (2013.01); *B60C 2009/0466* (2013.01); *B60C 2011/0016* (2013.01); *B60C 2011/0025* (2013.01); *B60C 11/0332* (2013.01); *B60C 13/001* (2013.01); *B60C 13/02* (2013.01); *B60C 15/0036* (2013.01)

PNEUMATIC TIRE

TECHNICAL FIELD

The present disclosure relates to a pneumatic tire.

BACKGROUND ART

Conventionally, there have been proposed various pneumatic tires having an improved profile in a meridian cross section of the tire including the tire rotational axis.

Patent document 1 below discloses a pneumatic tire which achieves both steering stability and suppression of uneven wear by being provided with three arcs in the tread surface.

PRIOR ART DOCUMENT

Patent Documents

Patent Document 1: Japanese Patent Application Publication No. 2013-060129

SUMMARY OF THE INVENTION

Problems to be Solved by the Invention

In recent years, on the other hand, especially for passenger car tires, there has been an increasing demand for appearance performance which is considered as a sense of unity between the vehicle and the tire, and an increasing demand for noise performance with the spread of electric vehicles, etc.

In view of the situation as described above, the present disclosure was made, and a main objective thereof is to provide a pneumatic tire capable of achieving both the above-said appearance performance and noise performance.

Means for Solving the Problems

According to the present disclosure, a pneumatic tire comprises a tread portion having a first tread edge and a second tread edge, a pair of sidewall portions, a pair of bead portions, a carcass extending between the paired bead portions, and an inner rubber which extends between the paired bead portions, on the inner side of side of the carcass, wherein
  the inner rubber comprises a first portion extending through the tread portion with a first thickness, and a second portion extending through the paired sidewall portions with a second thickness,
  the first thickness is larger than the second thickness,
  the tread portion has a ground contacting surface between the first tread edge and the second tread edge,
  the paired sidewall portions respectively have outer surfaces extending inward in the tire radial direction from the first tread edge and the second tread edge, respectively,
  the ground contacting surface has a tire equator at a central position in the tire axial direction between the first tread edge and the second tread edge,
  the outer surfaces have tire maximum width positions which are outermost positions in the tire axial direction, and
  in a meridian cross section of the tire under a normal state when mounted on a regular rim, inflated to a normal internal pressure and loaded with no tire load,
  when
    a first reference point which is an intersection of a straight line extending parallel to the tire radial direction through the tire equator with a bead base line;
    a second reference point which is an intersection of a straight line extending parallel to the tire axial direction through the tire equator with a straight line extending parallel to the tire radial direction through the tire maximum width position;
    a reference line segment connecting the first reference point and the second reference point;
    a shoulder reference point which is an intersection of the reference line segment with the ground contacting surface or the outer surface; and
    a shoulder line segment connecting the first reference point and the shoulder reference point,
  are defined,
  then the length of the shoulder line segment is 85.9% to 89.3% of the length of the reference line segment.

Effects of the Invention

The pneumatic tire of the present disclosure can achieve both the appearance performance and noise performance by being provided with the above-described configuration.

DETAILED DESCRIPTION OF THE INVENTION

Hereinafter, an embodiment of the present disclosure will be described in detail in conjunction with accompanying drawings.

Figure 1:
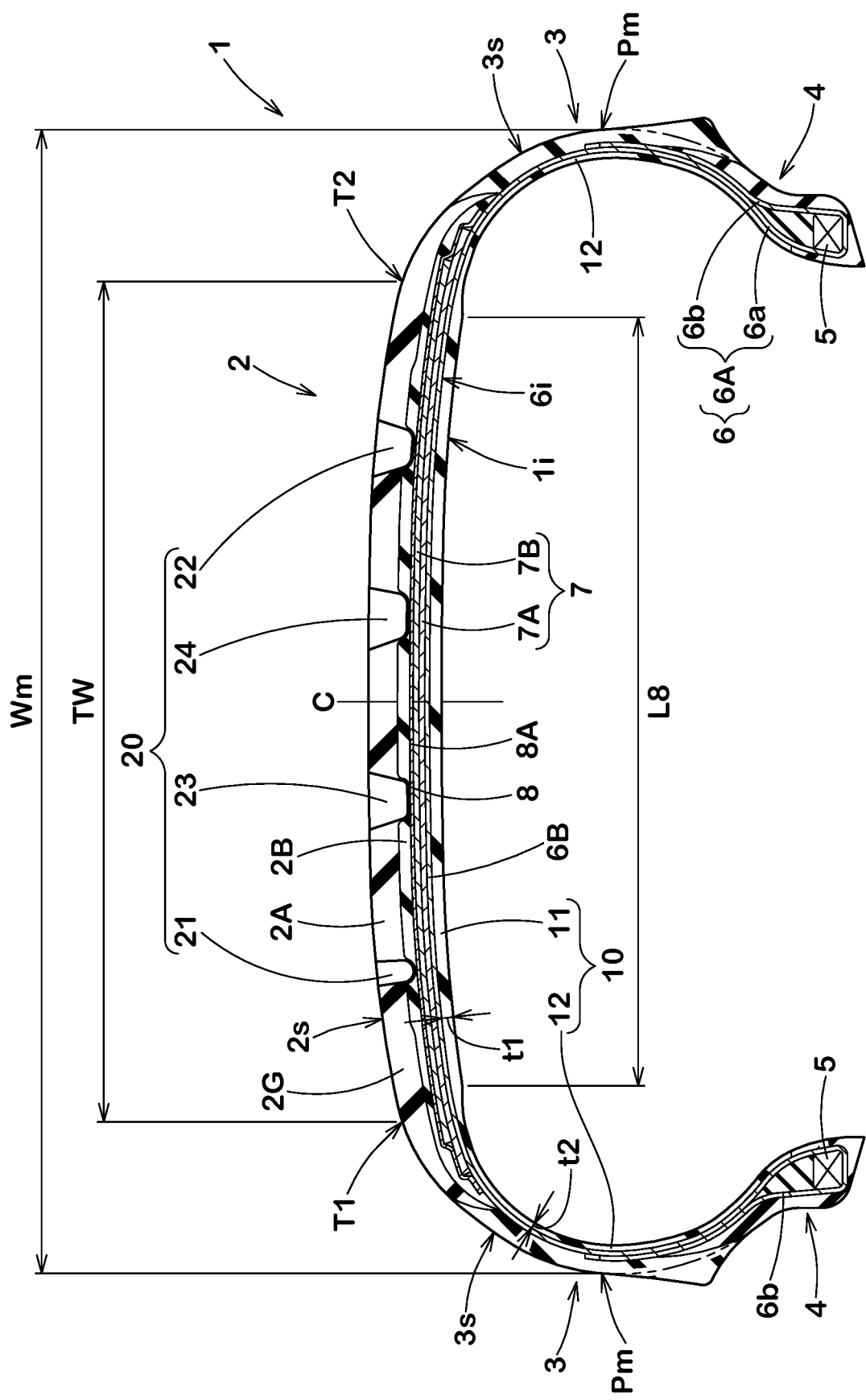
FIG. 1 is a cross-sectional view of a pneumatic tire as an embodiment of the present disclosure.

FIG. 1 is a cross-sectional view of a pneumatic tire 1 of the present embodiment (hereinafter sometimes simply referred to as the "tire 1"), including the rotational axis, under its normal state.

Here, the "normal state" is a state of the pneumatic tire 1 which is mounted on a regular rim, and inflated to a normal internal pressure, and loaded with no tire load. Hereinafter, dimensions, positions and the like of each portion or component of the pneumatic tire 1 refer to those under the normal state unless otherwise noted.

When components of the tire 1 cannot be directly measured under the normal state (for example, internal components) dimensions and the like thereof refer to values measured with the tire 1 in a state that approximates the normal state as much as possible.

If there is a standard system including standards on which the pneumatic tire 1 is based, the "regular rim" is a wheel rim specified for the tire by the standard system, for example, the "Standard Rim" in JATMA, "Design Rim" in TRA, and "Measuring Rim" in ETRTO.

If there is no standard system including standards on which the pneumatic tire 1 is to be based, the "regular rim" means a wheel rim which has the smallest rim diameter among the wheel rims on which the tire can be mounted without causing air leakage, and which has the smallest rim width among them.

If there is a standard system including standards on which the pneumatic tire 1 is based, the "normal internal pressure" means air pressure specified for the tire by the standard system, for example, the "maximum air pressure" in JATMA, the maximum value described in the table "TIRE LOAD LIMITS AT VARIOUS COLD INFLATION PRESSURES" in TRA, and the "INFLATION PRESSURE" in ETRTO.

If there is no standard system including standards on which the tire 1 is to be based, the "normal internal pressure" is air pressure specified for the tire by the tire manufacturer or the like.

As shown in FIG. 1, the tire 1 of the present embodiment comprises a tread portion 2, a pair of sidewall portions 3, and a pair of bead portions 4.

The bead portions 4 are each provided with, for example, an annular bead core 5 embedded therein.

The bead core 5 is made of a wound steel wire, for example.

The tire 1 of the present embodiment is designed to be suitably used as a passenger car tire. But, the present disclosure is not limited to tires for passenger cars, and can be applied to various tires such as tires for heavy duty vehicles, tires for two-wheeled vehicles, tires for industrial vehicles and the like.

The tire 1 of the present embodiment comprises a carcass 6 extending between the paired bead portions 4, and an inner rubber 10 extending between the paired bead portions 4, on the inner side of the carcass 6.

The inner rubber 10 in this embodiment forms the tire inner cavity surface 1$i$.

The carcass 6 is composed of at least one, in this embodiment, only one carcass ply 6A.

The carcass ply 6A comprises, for example, a main portion 6$a$ and turnup portions 6$b$.

The main portion 6$a$ extends, for example, between the two bead portions 4.

The turnup portion 6$b$ is, for example, connected to the main portion 6$a$ and folded back around the bead core 5 from the inside to the outside in the tire axial direction.

The inner rubber 10 in the present embodiment comprises
a first portion 11 extending through the tread portion 2 with a first thickness t1, and
a second portion 12 extending through the paired sidewall portions 3 with a second thickness t2.

Here, the first thickness t1 and the second thickness t2 mean the thickness from the inner surface 6$i$ of the carcass 6 to the tire inner cavity surface 1$i$, not including that of the topping rubber of the carcass ply 6A described later.

The first thickness t1 in this embodiment is more than the second thickness t2. It is preferable that the first thickness t1 is more than the second thickness t2 over the entire circumference of the tire.

Such inner rubber 10 can exhibit the same vibration reduction effect as that of increasing the thickness of the tread rubber 2G which will be described later, with a small increase in weight.

As the increase in weight on the inner side of the carcass 6 has little effect on the rolling resistance, the tire 1 of the present embodiment can improve noise performance, while maintaining good fuel efficiency performance.

Here, that the first thickness t1 is larger than the second thickness t2 means that the average value of the first thickness t1 is larger than the average value of the second thickness t2.

The average value of the first thickness t1 corresponds to a value obtained by dividing the cross-sectional area of the first portion 11 by the length of the first portion 11 along the tire inner cavity surface 1$i$ in the meridian cross section of the tire.

The same applies to the average value of the second thickness t2.

The tread portion 2 in this embodiment has a ground contacting surface 2$s$ between the first tread edge T1 and the second tread edge T2.

Here, the first tread edge T1 and the second tread edge T2 are the outermost edges in the tire axial direction when the tire 1 under its normal state is set on a flat horizontal surface at a camber angle of 0 degrees and loaded with 70% of the normal load.

If there is a standard system including standards on which the tire 1 is based, the "normal load" is a load specified for the tire by the standard system, for example, the "maximum load capacity" in JATMA, the maximum value described in the table "TIRE LOAD LIMITS AT VARIOUS COLD INFLATION PRESSURES" in TRA, and the "LOAD CAPACITY" in ETRTO.

If there is no standard system including standards on which the tire 1 is to be based, the "normal load" is a maximum load applicable to the tire in use, specified for the tire by the tire manufacturer or the like.

The ground contacting surface 2$s$ has a tire equator C at the central position in the tire axial direction between the first tread edge T1 and the second tread edge T2.

The tread portion 2 preferably comprises a tread rubber 2G which forms the ground contacting surface 2$s$.

The tread portion 2 may comprise, for example, a cap rubber 2A which forms the ground contacting surface 2$s$, and a base rubber 2B disposed inside the cap rubber 2A in the tire radial direction.

Hereinafter, when the tread portion 2 is made of a plurality of rubber materials, the tread rubber 2G means the cap rubber 2A which is the rubber material forming the ground contacting surface 2$s$, unless otherwise noted.

The tread portion 2 is however, not limited to such example, and may be composed of, for example, only one rubber layer, or may be composed of three or more rubber layers.

The paired sidewall portions 3 in this embodiment have outer surfaces 3$s$ extending inward in the tire radial direction from the first tread edge T1 and the second tread edge T2, respectively.

On the outer surface 3s, there is a maximum tire width position Pm, which is the outermost position in the tire axial direction.

The tire maximum width positions Pm are positions where the distance in the tire axial direction therebetween becomes the maximum width Wm on the outer surfaces 3s excluding locally projecting portions.

Figure 2:
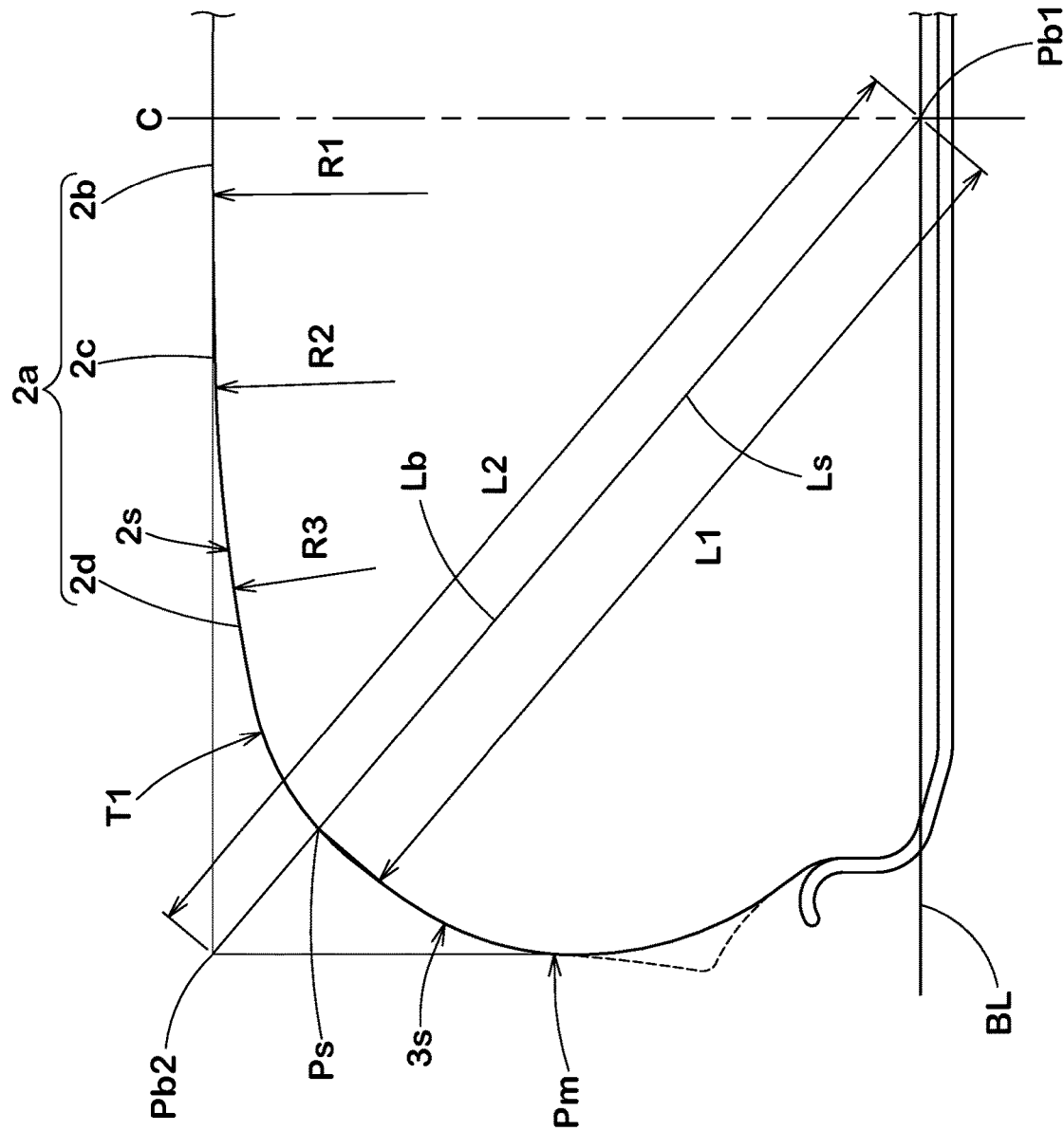
FIG. 2 is an explanatory diagram showing cross-sectional shapes of the ground contacting surface and the outer surface on one side of the tire equator C.

FIG. 2 is a diagram for explaining shapes of the ground contacting surface 2s and the outer surface 3s in the meridian cross section of the tire under its normal state. As shown in FIG. 2, in the meridian cross section of the tire 1 of the present embodiment, the tire has a profile on which a first reference point Pb1, a second reference point Pb2, a reference line segment Lb, a shoulder reference point Ps, and a shoulder line segment Ls are defined.

The first reference point Pb1 is an intersection of a bead base line BL with a straight line extending parallel to the tire radial direction through the tire equator C.

The bead base line BL is a straight line extending parallel to the tire axial direction through a position in the tire radial direction corresponding to the rim diameter position of the regular rim, in the tire 1 under its normal state.

The second reference point Pb2 is an intersection of a straight line extending parallel to the tire axial direction through the tire equator C with a straight line extending parallel to the tire radial direction through the tire maximum width position Pm.

The reference line segment Lb is a line segment extending straight between the first reference point Pb1 and the second reference point Pb2.

The shoulder reference point Ps is an intersection of the reference line segment Lb with the ground contacting surface 2s or the outer surface 3s.

When the reference line segment Lb passes through a position between the first tread edge T1 and the second tread edge T2 as shown in FIG. 1, the shoulder reference point Ps is the intersection of the reference line segment Lb with the ground contacting surface 2s.

When the reference line segment Lb passes through the axially outer side of the first or second tread edge T1 or T2, the shoulder reference point Ps is the intersection of the reference line segment Lb with the outer surface 3s.

The shoulder line segment Ls is a line segment extending straight between the first reference point Pb1 and the shoulder reference point Ps.

The length L1 of the shoulder line segment Ls in this embodiment is set in a range from 85.9% to 89.3% of the length L2 of the reference segment Lb.

Such tire 1 can reduce the wheel house/tire house, namely, the space between the tire and the vehicle body when the tire 1 is mounted on a vehicle, therefore, the sense of unity between the tire and the vehicle can be enhanced.

Further, such tire 1 can suppress an increase in vibration of the tread portion 2 due to the change in profile because the first portion 11 has the large first thickness t1 and is excellent in noise performance. Therefore, the tire 1 of the present embodiment can achieve both the appearance performance and noise performance.

Preferably, the ground contacting surface 2s is composed of a plurality of arcs 2a having mutually different radii of curvature. The plurality of arcs 2a includes, for example, a first arc 2b passing through the tire equator C, a second arc 2c adjacent to the first arc 2b on the outer side in the tire axial direction, and a third arc 2d adjacent to the second arc 2c on the outer side in the tire axial direction.

Such ground contacting surface 2s is suitable for improving the appearance performance of the tire 1 while suppressing uneven wear.

The radius R1 of curvature of the first arc 2b is preferably 1.85 to 2.00 times the radius R2 of curvature of the second arc 2c.

By setting the radius R1 of curvature of the first arc 2b being not less than 1.85 times the radius R2 of curvature of the second arc 2c, the wheel house when the tire is mounted on a vehicle can be reduced, namely the distance between the tire 1 and the vehicle body (fender) can be reduced, which helps to improve the appearance performance of tire 1. From this point of view, it is more preferable that the radius R1 of curvature of the first arc 2b is not less than 1.90 times the radius R2 of curvature of the second arc 2c.

By setting the radius R1 of curvature of the first arc 2b being not more than 2.00 times the radius R2 of curvature of the second arc 2c, uneven ground contacting surface pressure distribution is suppressed, which helps to improve the uneven wear resistance performance of the tire 1.

From this point of view, it is more preferable that the radius R1 of curvature of the first arc 2b is not more than 1.95 times the radius R2 of curvature of the second arc 2c.

The radius R2 of curvature of the second arc 2c is preferably from 2.08 to 2.74 times the radius R3 of curvature of the third arc 2d.

By setting the radius R2 of curvature of the second arc 2c being not less than 2.08 times the radius R3 of curvature of the third arc 2d, the distance between the tire 1 and the vehicle body when mounted on the vehicle can be reduced, which helps to improve the appearance performance of the tire 1.

From this point of view, it is more preferable that the radius R2 of curvature of the second arc 2c is not less than 2.30 times the radius R3 of curvature of the third arc 2d.

As the radius R2 of curvature of the second arc 2c is not more than 2.74 times the radius R3 of curvature of the third arc 2d, uneven ground contacting surface pressure distribution is suppressed, and uneven wear resistance of the tire 1 can be improved. From this point of view, it is more preferable that the radius R2 of curvature of the second arc 2c is not more than 2.50 times the radius R3 of curvature of the third arc 2d.

As shown in FIG. 1, a tread width TW, which is the distance in the tire axial direction between the first tread edge T1 and the second tread edge T2, is preferably from 74% to 84% of the maximum width Wm, which is the distance in the tire axial direction between the maximum tire width positions Pm.

As the tread width TW is 74% or more of the maximum width Wm, it is possible to reduce the ground contacting surface pressure, and suppress noise generation, and improve the noise performance of the tire 1.

From this point of view, it is more preferable that the tread width TW is 79% or more of the maximum width Wm.

By setting the tread width TW being not more than 84% of the maximum width Wm, it is possible to suppress the occurrence of slippage in the shoulder region and improve the uneven wear resistance performance of the tire 1.

From this point of view, it is more preferable that the tread width TW is not more than 81% of the maximum width Wm.

For the tire 1, for example, the mounting direction to a vehicle is designated.

It is preferable that the tire 1 is mounted on a vehicle so that the first tread edge T1 is positioned outboard of the vehicle, and the second tread edge T2 is positioned inboard of the vehicle.

Such mounting direction to the vehicle is, for example, indicated by letters and/or symbols on the outer surface 3s of the sidewall portion 3.

The tire 1 is however, not limited to such example, and the tire 1 may be one for which the mounting direction to the vehicle is not specified, for example.

It is preferable that the tread portion 2 comprises a plurality of circumferential grooves 20 continuously extending in the tire circumferential direction between the first tread edge T1 and the second tread edge T2.

The plurality of circumferential grooves 20 includes, for example, a first shoulder circumferential groove 21, a second shoulder circumferential groove 22, a first crown circumferential groove 23, and a second crown circumferential groove 24.

However, the tread portion 2 is not limited to such example. For example, the tread portion 2 may comprise three or less circumferential grooves 20 or the tread portion 2 may comprise five or more circumferential grooves 20.

The first shoulder circumferential groove 21 is disposed between the first tread edge T1 and the tire equator C, in this embodiment, disposed closest to the first tread edge T1 among the plurality of circumferential grooves 20.

The second shoulder circumferential groove 22 is disposed between the second tread edge T2 and the tire equator C, in this embodiment, disposed closest to the second tread edge T2 among the plurality of circumferential grooves 20.

The first crown circumferential groove 23 in this embodiment is disposed between the first shoulder circumferential groove 21 and the tire equator C.

The second crown circumferential groove 24 in this embodiment is deposed between the second shoulder circumferential groove 22 and the tire equator C.

Each of the circumferential grooves 20 extends linearly in parallel to the tire circumferential direction, for example.

The plurality of circumferential grooves 20 are not limited to such aspect, may be extended in the tire circumferential direction in a wavy form, for example.

Further, some of the circumferential grooves 20 may be extended linearly, and the rest may be extended in a wavy form.

It is preferable that the groove width of each of the circumferential grooves 20 is 3 mm or more.

In this embodiment, the groove width of the first crown circumferential groove 23 is the smallest among the groove widths of the circumferential grooves 20. Such circumferential grooves 20 can suppress the generation of the vehicle exterior noise when mounted on the vehicle, and can improve the noise performance while maintaining good wet performance of the tire 1.

Figure 3:
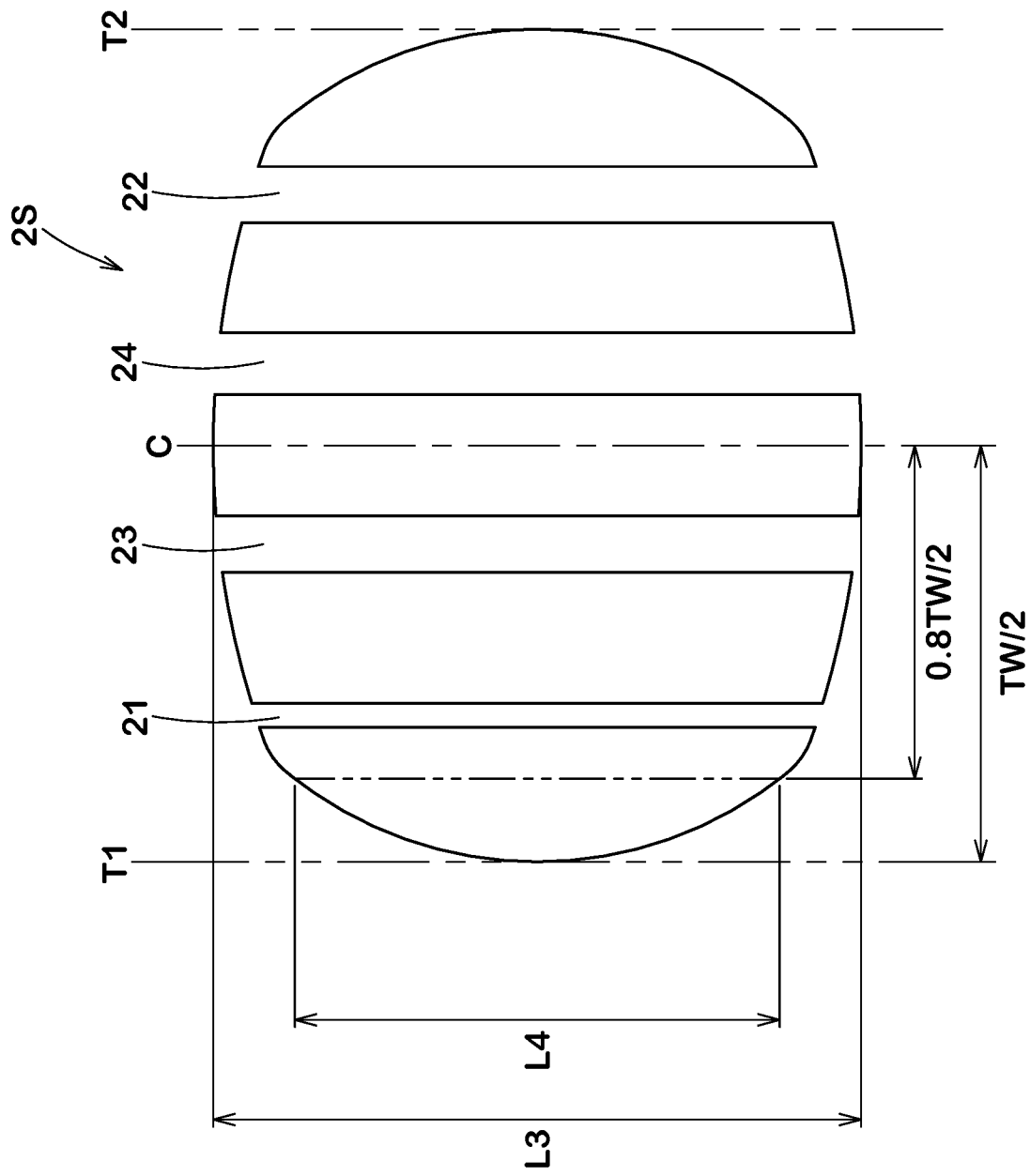
FIG. 3 is a schematic diagram showing the shape of the ground contacting surface of the tire.

FIG. 3 is a diagram schematically showing the shape 2S of the ground contacting surface 2s of the tire 1.

As shown in FIG. 3, the shape 2S of the ground contacting surface 2s in the present embodiment is the shape when the tire 1 under its normal state is set on a horizontal flat surface at a camber angle of 0 degrees and loaded with 70% of the normal load.

The shape of the ground contacting surface 2s can be expressed by, for example, a ground contacting surface index F (L3/L4) which is the ratio of the length L3 in the tire circumferential direction measured at the tire equator C, and the length L4 in the tire circumferential direction measured in the shoulder region on the first tread edge T1 side.

Here, the length L4 in the tire circumferential direction is the length in the tire circumferential direction of the ground contacting surface shape 2S measured at a position of 80% (0.8 TW/2) of the distance (TW/2) from the tire equator C toward the first tread edge T1.

The length L4 in the tire circumferential direction may be, for example, the length in the shoulder region on the second tread edge T2 side.

The ground contacting surface index F in this embodiment is 1.05 to 1.35.

By setting the ground contacting surface index F being 1.05 or more, the occurrence of slippage in the shoulder region can be suppressed, and the uneven wear resistance performance of the tire 1 can be improved.

By setting the ground contacting surface index F being 1.35 or less, the ground contacting surface pressure is reduced, the generation of noise can be suppressed, and the noise performance of the tire 1 can be improved.

Figure 4:
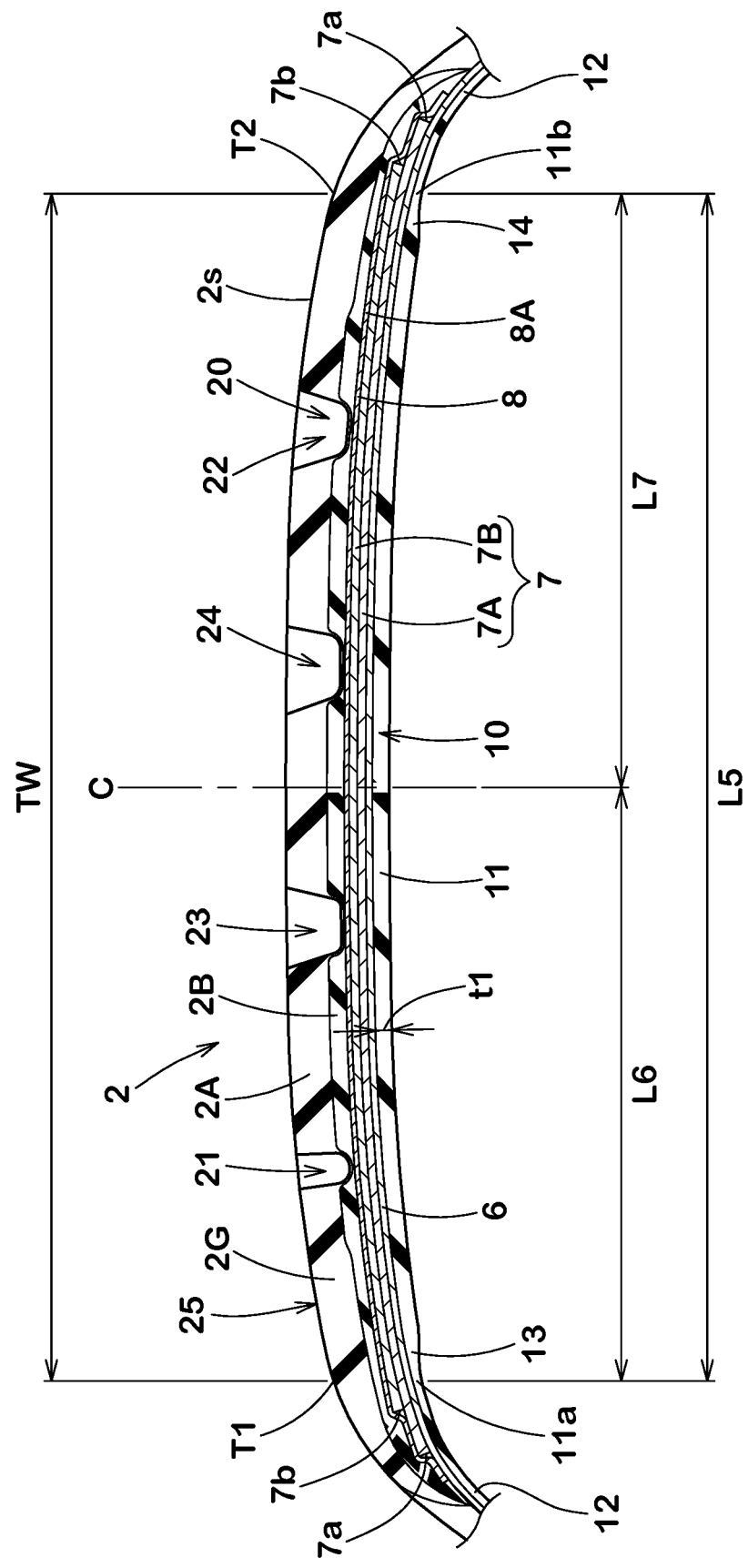
FIG. 4 is an enlarged cross-sectional view of the tread portion of FIG. 1.

FIG. 4 is a cross-sectional view of the tread portion 2.

In this embodiment, a loss tangent tan δ1 at 70 degrees C. of the first portion 11 is not less than a loss tangent tan δ2 at 70 degrees C. of the second portion 12. Such first portion 11 helps to suppress vibrations of the tread portion 2 and can improve the noise performance of the tire 1.

It is preferable that the loss tangent tan δ1 of the first portion 11 at 70 degrees C. is not more than a loss tangent tan δA of the tread rubber 2G at 30 degrees C. Since the tread rubber 2G forming the ground contacting surface 2s contacts with the outside air and cooled thereby, 30 degrees C. is adopted as the measuring temperature.

Such first portion 11 can reduce the influence of the tread portion 2 on the rolling resistance, and helps to improve the fuel efficiency performance of the tire 1. Therefore, the tire 1 of the present embodiment can achieve both the low fuel consumption performance and noise performance.

In this specification, the loss tangent tan δ is measured according to JIS-K6394 under the following conditions using a dynamic viscoelasticity measuring device. The specimen used for measuring the loss tangent tan δ is taken out from the vulcanized tire 1, for example, so that the longitudinal direction of the specimen coincides with the circumferential direction of the tire 1.

temperature: 30 degrees C. or 70 degrees C.
   initial strain: 5% when the measuring temperature is 30 degrees C., and
     10% when the measuring temperature is 70 degrees C.
   amplitude of dynamic strain: +/−1%
   frequency: 10 Hz
   deformation mode: tensile Incidentally, the loss tangent tan δ can be adjusted by changing the glass transition point Tg of the rubber composition, and the types and amounts of various compounding agents. Specifically, the loss tangent tan δ can be increased by increasing the glass transition point Tg of the rubber composition, reducing the average particle size of reinforcing agents such as carbon and silica, increasing the amount of the reinforcing agent, and/or reducing the amount of the vulcanizing agent such as sulfur, accelerators, etc.

Unless otherwise noted, the loss tangent described below is measured when the specimen is at a temperature of 70 degrees C.

When the first portion 11 is made up a single rubber material, the loss tangent tan δ1 of the first portion 11 is the loss tangent tan δ1 of the single rubber material. When the first portion 11 is made up a plurality of rubber materials, the loss tangent tan δ1 of the first portion 11 is a weighted average which are obtained by weighting the loss tangent tan δ values of the rubber materials by the cross-sectional areas of the respective rubber materials.

The same applies to the loss tangents tan δ of another portion.

Preferably, the loss tangent tan δ1 of the first portion 11 is set in a range from 1.0 to 2.0 times the loss tangent tan δ2 of the second portion 12.

As the loss tangent tan δ1 of the first portion 11 is not less than 1.0 times the loss tangent tan δ2 of the second portion 12, the effect suppressing the vibration of the tread portion 2 can be reliably exhibited.

From this point of view, it is more preferable that the loss tangent tan δ1 of the first portion 11 is not less than 1.1 times the loss tangent tan δ2 of the second portion 12.

As the loss tangent tan δ1 of the first portion 11 is not more than 2.0 times the loss tangent tan δ2 of the second portion 12, failure such as separation due to an excessive difference in physical properties can be suppressed, and the durability performance of the tire 1 can be improved.

From this point of view, it is more preferable that the loss tangent tan δ1 of the first portion 11 is not more than 1.5 times the loss tangent tan δ2 of the second portion 12.

Preferably, the loss tangent tan δ1 of the first portion 11 is set in a range from 0.4 to 0.7 times the loss tangent tan δA of the tread rubber 2G.

As the loss tangent tan δ1 of the first portion 11 is not less than 0.4 times the loss tangent tan δA of the tread rubber 2G, it is possible to reduce vibrations of the tread portion 2, while maintaining the fuel efficiency of the tire 1.

As the loss tangent tan δ1 of the first portion 11 is not more than 0.7 times the loss tangent tan δA of the tread rubber 2G, it is possible to reduce vibrations of the tread portion 2, while maintaining the steering stability performance of the tire 1.

Preferably, the loss tangent tan δ1 of the first portion 11 is 0.14 or more.

As the loss tangent tan δ1 of the first portion 11 is 0.14 or more, vibrations of the tread portion 2 can be reliably suppressed, and noise generation can be reduced.

From this point of view, it is more preferable that the loss tangent tan δ1 of the first portion 11 is 0.15 or more, still more preferably 0.20 or more.

It is preferable that the loss tangent tan δ of the first portion 11 at 30 degrees C. is 0.4 to 0.7 times a loss tangent tan δ of the base rubber 2B at 30 degrees C.

As the loss tangent tan δ of the first portion 11 is not less than 0.4 times the loss tangent tan δ of the base rubber 2B, it is possible to reduce vibrations of the tread portion 2.

As the loss tangent tan δ of the first portion 11 is not more than 0.7 times the loss tangent tan δ of the base rubber 2B, it is possible to reduce the rolling resistance of the tire 1.

The loss tangent tan δA of the tread rubber 2G is preferably 0.30 or less.

As the loss tangent tan δA of the tread rubber 2G is 0.30 or less, the rolling resistance is reduced, and it is possible to improve the fuel economy performance of the tire 1.

From this point of view, it is more preferable that the loss tangent tan δA of the tread rubber 2G is 0.25 or less, and still more preferably 0.20 or less.

When the tread portion 2 is made up of the cap rubber 2A and the base rubber 2B, the loss tangent tan δA of the tread rubber 2G at 30 degrees C. is the loss tangent tan δA of the cap rubber 2A at 30 degrees C.

At this time, it is preferable that the loss tangent tan δB of the base rubber 2B at 70 degrees C. is smaller than the loss tangent tan δA of the cap rubber 2A at 30 degrees C.

Such tread portion 2 helps to improve the fuel efficiency performance, while maintaining good steering stability performance of the tire 1.

The loss tangent tan δB of the base rubber 2B is preferably 0.21 or less.

As the loss tangent tan δB of the base rubber 2B is 0.21 or less, heat generation in the tread portion 2 during running is suppressed, which helps to maintain the good fuel efficiency of the tire 1.

From this point of view, it is more preferable that the loss tangent tan δB of the base rubber 2B is 0.20 or less.

It is preferable that a complex elastic modulus E*A of the tread rubber 2G at 30 degrees C. is 7.8 MPa or more.

As the complex elastic modulus E*A of the tread rubber 2G is 7.8 MPa or more, vibrations of the tread portion 2 are suppressed, which helps to improve the noise performance of the tire 1.

From this point of view, it is more preferable that the complex elastic modulus E*A of the tread rubber 2G is 8.0 MPa or more, still more preferably 9.0 MPa or more.

When the tread rubber 2G is made up of a plurality of rubber materials, the complex elastic modulus E*A is of the rubber material which forms the ground contacting surface 2s.

In this specification, the complex elastic modulus E* is measured according to JIS-K6394 under the following conditions using a dynamic viscoelasticity measuring device. The specimen for measuring the complex elastic modulus E* is, for example, taken out from the vulcanized tire 1 so that the longitudinal direction of the specimen coincides with the circumferential direction of the tire 1.

initial strain: 5%
amplitude of dynamic strain: +/−1%
frequency: 10 Hz
deformation mode: tensile
measuring temperature: 30 degrees C.

The complex elastic modulus E* can be adjusted by changing the glass transition point Tg of the rubber composition and the types and amounts of various compounding agents. Specifically, the complex elastic modulus E* can be increased by increasing the glass transition point Tg of the rubber composition decreasing the average particle size of a reinforcing agent such as carbon and silica, increasing the amount of the reinforcing agent, decreasing the total amount of plasticize, and/or increasing vulcanizing agents such as sulfur, accelerators, etc.

As shown in FIG. 1, it is preferable that the tread portion 2 in the present embodiment is provided with a belt layer 7 disposed outside the carcass 6 in the tire radial direction.

In the tread portion 2 in the present embodiment, a band layer 8 is further disposed outside the belt layer 7 in the tire radial direction.

The carcass ply 6A comprises a plurality of carcass cords 6B and topping rubber covering the carcass cords.

The carcass cords 6B are, for example, organic fiber cords such as aramid, rayon, etc.

The carcass cords 6B are preferably arranged at an angle of from 70 to 90 degrees with respect to the tire equator C.

The loss tangent tan δC at 70 degrees C. of the topping rubber of the carcass ply 6A is preferably 0.16 or less.

As the loss tangent tan δC of the topping rubber of the carcass ply 6A is 0.16 or less, heat generation in the carcass ply 6A is suppressed, and it becomes possible to achieve both the low fuel consumption performance and durability performance of the tire 1 during high-speed running.

From this point of view, it is more preferable that the loss tangent tan δC of the topping rubber of the carcass ply 6A is 0.15 or less.

From the viewpoint of improving the noise performance of the tire 1, it is preferable to make the loss tangent tan δC of the topping rubber of the carcass ply 6A smaller than the loss tangent tan δ1 of the first portion 11.

As shown in FIG. 1, in the tire 1 of the present embodiment, the twist coefficient K of the carcass cords 6B is set in a range from 2000 to 2500.

The twist coefficient K is defined by the product of T and the root D (K=T√D)

wherein

T is the number of twists per 100 mm, and

D is the total fineness (dtex) of the carcass cord 6B.

The twist coefficient K is of the carcass cord 6B after a dip treatment.

If a cord having a small twist coefficient K is used as the carcass cord 6B, the fatigue resistance of the cord may be deteriorated, which may affect the durability of the tire 1.

In the tire 1 of the present embodiment, as the twist coefficient of the carcass cords 6B is set to 2000 or more, the fatigue resistance of the cord is improved, and the durability performance of the tire 1 is improved.

If a cord having a large twist coefficient K is used as the carcass cord 6B, good attenuation cannot be obtained from the sidewall portions 3 to the bead portions 4, which may affect the noise performance of the tire 1.

Further, the deformation of a case structure including the carcass 6 from the sidewall portion 3 to the bead portion 4 is increased, and the rolling resistance is increased.

In the tire 1 of the present embodiment, as the twist coefficient K of the carcass cord 6B is set to 2500 or less, good attenuation is obtained from the sidewall portions 3 to the bead portions 4, and the noise performance of the tire 1 is improved, and as a result, the vehicle interior noise is reduced.

Further, the deformation of the case structure is suppressed, and the rolling resistance can be reduced.

In the tire 1 of the present embodiment, the above-described first portion 11 functions as a mass damper to suppress vibrations of the tread portion 2.

Furthermore, the vibrational energy of the tread portion 2 is attenuated by the viscoelastic properties of the rubber itself disposed in the first portion 11.

Therefore, as compared with a conventional pneumatic tire in which the first portion 11 is not provided, in the tire 1 of the present embodiment, the cord with the large twist coefficient K can be used as the carcass cord 6B.

On the other hand, the increase in rolling resistance, which is a concern due to the provision of the first portion 11, can be suppressed as setting the upper limit of the twist coefficient K of the carcass cords 6B to 2,500.

In the tire 1 of the present embodiment, as the carcass cords 6B having the twist coefficient K is optimized in accordance with the first thickness t1 of the first portion 11, it becomes possible to reduce the vehicle interior noise, without increasing the rolling resistance.

In the tire 1 of the present embodiment, due to the synergistic effect of the carcass cords 6B having the twist coefficient K of 2000 to 2500 and the rubber of the first portion 11 having the above-described loss tangent tan δ, it becomes possible to reduced the vehicle interior noise, without increasing the rolling resistance.

The tire 1 of the present embodiment has a so-called high turned-up structure in which the radially outer ends of the turnup portions 6b of the carcass 6 are positioned radially outside the maximum width position Pm of the tire 1.

Such carcass 6 makes it difficult for vibrations of the sidewall portion 3 to be transmitted to the bead portion 4, thereby making it possible to reduce the vehicle interior noise. Further, since the deformation of the case structure is suppressed from the sidewall portion 3 to the bead portion 4, the rolling resistance can be reduced.

The tire 1 of the present embodiment may have a so-called ultra-high turned-up structure in which the radially outer ends of the turnup portions 6b of the carcass 6 are respectively located axially inside the axially outer ends of the belt layer 7.

The carcass cord 6B used in this embodiment is a polyethylene terephthalate (PET) fiber cord. It is preferable that the number of carcass plies 6A and the fineness of the carcass cords 6B are determined as follows according to the load index of the tire 1. When the tire 1 has a load index of 90 or less, the carcass 6 is made up of a single carcass ply 6A, and the fineness of each carcass cord 6B is 1100 dtex/2.

When the tire 1 has a load index more than 90 and not more than 100, the carcass 6 is made up of a single carcass ply 6A, and the fineness of each carcass cord 6B is 1440 dtex/2. When the tire 1 has a load index more than 90 and not more than 105, the carcass 6 is made up of a single carcass ply 6A, and the fineness of each carcass cord 6B is 1670 dtex/2. When the tire 1 has a load index of 110 or less, the carcass 6 is made up of two carcass plies 6A, and the fineness of each carcass cord 6B is 1110 dtex/2.

When the tire 1 has a load index of 115 or less, the carcass 6 is made up of two carcass plies 6A, and the fineness of each carcass cord 6B is 1440 dtex/2.

When the tire 1 has a load index of 115 or less, the carcass 6 is made up of two carcass plies 6A, and the fineness of each carcass cords 6B may be 1670 dtex/2.

The belt layer 7 includes, for example, a first belt ply 7A adjacent to the carcass 6, and a second belt ply 7B disposed outside the first belt ply 7A in the tire radial direction. In the present embodiment, the first belt ply 7A and the second belt ply 7B each comprise a plurality of belt cords arranged at an angle of 15 to 45 degrees with respect to the tire circumferential direction, and a topping rubber covering the belt cords.

It is preferable that, with respect to the tire circumferential direction, the belt cords of the first belt ply 7A are inclined in opposite directions to the belt cords of the second belt ply 7B. Such belt layer 7 can effectively reinforce the tread portion 2.

In the present embodiment, as shown in FIG. 4, the axially outer edges 7b of the second belt ply 7B are respectively located axially inside the axially outer edges 7a of the first belt ply 7A. Accordingly, the axial length of the second belt ply 7B is smaller than the axial length of the first belt ply 7A.

In such belt layer 7, the tread portion 2 can be reinforced, while suppressing the second belt ply 7B from becoming excessively large, which helps to achieve both the fuel efficiency performance and the noise performance of the pneumatic tire 1.

The loss tangent tan δD at 70 degrees C. of the topping rubber of the first belt ply 7A is preferably 0.16 or less.

As the loss tangent tan δD of the topping rubber of the first belt ply 7A is 0.16 or less, heat generation in the first belt ply 7A is suppressed, and it becomes possible to achieve both the low fuel consumption performance and durability performance of the tire 1 during high-speed running.

From this point of view, it is more preferable that the loss tangent tan δD of the topping rubber of the first belt ply 7A is 0.15 or less.

From the viewpoint of improving the noise performance of the tire 1, it is preferable to make the loss tangent tan δD of the topping rubber of the first belt ply 7A smaller than the loss tangent tan δ1 of the first portion 11.

The loss tangent tan δE at 70 degrees C. of the topping rubber of the second belt ply 7B is preferably 0.16 or less.

As the loss tangent tan δE of the topping rubber of the second belt ply 7B is 0.16 or less, heat generation in the second belt ply 7B is suppressed, and it is possible to achieve both low fuel consumption performance and durability performance of the tire 1 during high-speed running.

From this point of view, it is more preferable that the loss tangent tan δE of the topping rubber of the second belt ply 7B is 0.15 or less.

From the viewpoint of improving the noise performance of the tire 1, it is preferable to make the loss tangent tan δE of the topping rubber of the second belt ply 7B smaller than the loss tangent tan δ1 of the first portion 11.

In this embodiment, the loss tangent tan δE of the second belt ply 7B is equal to the loss tangent tan δD of the first belt ply 7A.

Such belt layer 7 can make it possible to uniformly manage the materials forming the first belt ply 7A and the second belt ply 7B, which may reduce the manufacturing cost of the tire 1.

The band layer 8 is composed of at least one band ply 8A, in this embodiment, only one band ply 8A.

The band ply 8A comprises, for example, at least one band cord arranged at an angle of 5 degrees or less with respect to the tire circumferential direction, and a topping rubber covering the band cord or cords.

The band layer 8 in this embodiment is arranged so as to cover the entire belt layer 7.

The loss tangent tan δF at 70 degrees C. of the topping rubber of the band ply 8A is preferably 0.16 or less.

As the loss tangent tan δF of the topping rubber of the band ply 8A is 0.16 or less, heat generation in the band ply 8A can be suppressed, and it is possible to achieve both the low fuel consumption performance and durability performance of the tire 1 during high-speed running.

From this point of view, it is more preferable that the loss tangent tan δF of the topping rubber of the band ply 8A is 0.15 or less.

From the viewpoint of improving the noise performance of the tire 1, it is preferable to make the loss tangent tan δF of the topping rubber of the band ply 8A smaller than the loss tangent tan δ1 of the first portion 11.

Figure 5:
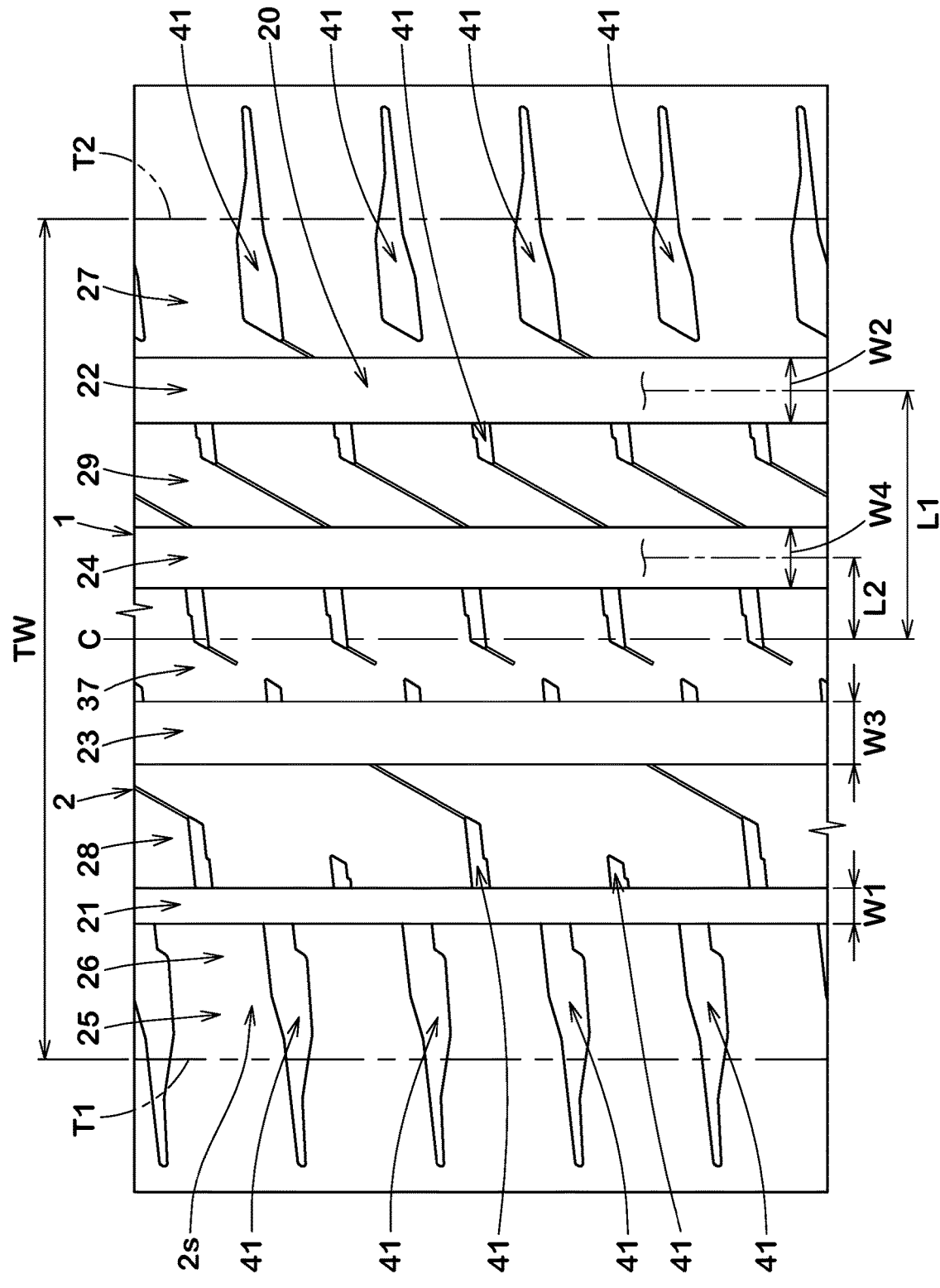
FIG. 5 is a developed partial view of the ground contacting surface of the tread portion of FIG. 1.

FIG. 5 shows a developed partial view of the ground contacting surface 2s of the tread portion 2 of FIG. 1.

The ground contacting surface 2s of the tread portion 2 corresponds to a surface between the first tread edge T1 and the second tread edge T2, of the outer surface of the tread portion 2.

In this embodiment, as shown in FIG. 5, the land ratio of the tread portion 2 is 65% or more.

In the present specification, the "land ratio" means a ratio Sb/Sa of the actual total ground contacting area Sb to the total area Sa of a virtual ground contacting surface in which all the grooves and sipes existing in the ground contacting surface 2s of the tread portion 2 are filled.

In this embodiment, by adopting the above configuration, it is possible to reduce both the vehicle exterior noise and the vehicle interior noise. The reason is as follows.

It has been known that, in general, when the land ratio of the tread portion becomes smaller, the pattern noise increases and the vehicle exterior noise increases. Also, it has been known that, in general, when the land ratio is increased, although the pattern noise is reduced, the vibration from the road surface is more likely to be transmitted to the vehicle through the tire, and as a result, the vehicle interior noise is increased.

For this reason, conventional tires are often designed so as to have relatively small land ratios (less than 65%).

In the present embodiment, by setting the land ratio to 65% or more, the tire 1 is reduced in pattern noise, and thereby, the vehicle exterior noise can be reduced.

Further, as described above, in the tire 1 of the present embodiment, the first thickness t1 (shown in FIG. 1) of the first portion 11 is large, therefore, the tread portion 2 can effectively absorb vibrations from the road surface. As a result, even when the land ratio of the tread portion 2 is large, the vehicle interior noise can be reliably reduced.

For this reason, in the tire 1 of the present embodiment, both the vehicle exterior noise and the vehicle interior noise can be reduced.

The distance in the tire axial direction L1 from the tire equator C to the groove center line of the first shoulder circumferential groove 21, and the distance in the tire axial direction L1 from the tire equator C to the groove center line of the second shoulder circumferential groove 22, are preferably 25% to 35% of the tread width TW, for example.

The distance in the tire axial direction L2 from the tire equator C to the groove center line of the first crown circumferential groove 23, and the distance in the tire axial direction L2 from the tire equator C to the groove center line of the second crown circumferential groove 24, are preferably 5% to 15% of the tread width TW, for example.

Incidentally, the tread width TW is the distance in the tire axial direction from the first tread edge T1 to the second tread edge T2 of the tire under its normal state.

It is preferable that the groove width of each circumferential groove 20 is, for example, 4.0% to 8.5% of the tread width TW.

The total groove width of the plurality of circumferential grooves 20 is, for example, 20% to 30%, preferably 20% to 25%, of the tread width TW.

Thereby, it is possible to enhance the steering stability on a dry road surface, while reducing the vehicle exterior noise.

The groove width W3 of the first crown circumferential groove 23 is preferably larger than the groove width W1 of the first shoulder circumferential groove 21, for example. Specifically, the groove width W3 is 150% to 200% of the groove width W1. The groove width W4 of the second crown circumferential groove 24 is preferably larger than the groove width W2 of the second shoulder circumferential groove 22, for example. Specifically, the groove width W4 is 140% or less of the groove width W2, preferably 105% to 120%.

Thereby, the noise generated by the circumferential grooves 20 becomes difficult to diffuse outward of the vehicle, while ensuring wet performance, and the vehicle exterior noise can be reduced.

It is preferable that the depth of each circumferential groove 20 is 5 to 10 mm, for example, in the case of pneumatic tires for passenger cars.

The tread portion 2 comprises a plurality of land portions 25 including a crown land portion 37, a first middle land portion 28, a second middle land portion 29, a first shoulder land portion 26, and a second shoulder land portion 27.

The crown land portion 37 is defined between the first crown circumferential groove 23 and the second crown circumferential groove 24.

The first middle land portion 28 is defined between the first shoulder circumferential groove 21 and the first crown circumferential groove 23. Thereby, the first middle land portion 28 is adjacent to the crown land portion 37 via the first crown circumferential groove 23.

The second middle land portion 29 is defined between the second shoulder circumferential groove 22 and the second crown circumferential groove 24. Thereby, the second middle land portion 29 is adjacent to the crown land portion 37 via the second crown circumferential groove 24.

The first shoulder land portion 26 is defined axially outward of the first shoulder circumferential groove 21, and includes the first tread edge T1. Thereby, the first shoulder land portion 26 is adjacent to the first middle land portion 28 via the first shoulder circumferential groove 21.

The second shoulder land portion 27 is defined axially outward of the second shoulder circumferential groove 22, and includes the second tread edge T2. Thereby, the second shoulder land portion 27 is adjacent to the second middle land portion 29 via the second shoulder circumferential groove 22.

Each of the land portions 25 is provided with a plurality of lateral grooves 41. The arrangement of the lateral grooves 41 shown in FIG. 5 is merely an example, and the present disclosure is not limited thereto.

The first middle land portion 28 is preferably not divided in the tire circumferential direction by grooves having a groove width of 2 mm or more.

The crown land portion 37 is preferably not divided in the tire circumferential direction by grooves having a groove width of 2 mm or more.

The second middle land portion 29 is preferably not divided in the tire circumferential direction by grooves having a groove width of 2 mm or more.

Thereby, the pattern noise generated by the land portions 28, 37 and 29 is reduced, and the vehicle exterior noise can be reduced.

It is preferable that the land ratio Lac of the crown land portion 37 is larger than the land ratio Lam1 of the first middle land portion 28. Specifically, the land ratio Lac is more than 105%, preferably not less than 106%, but less than 120% of the land ratio Lam1. Thereby, the pattern noise generated by the crown land portion 37 can be reduced, and the steering stability and wear resistance performance on dry road surfaces can be enhanced.

It is preferable that the land ratio Lam1 of the first middle land portion 28 is larger than the land ratio Las1 of the first shoulder land portion 26. Specifically, the land ratio Lam1 is more than 105%, preferably not less than 106%, but less than 120% of the land ratio Las1. Thereby, the steering stability and wear resistance on dry road surfaces can be further enhanced.

From the same point of view, it is preferable that the land ratio Lam2 of the second middle land portion 29 is larger than the land ratio Las2 of the second shoulder land portion 27. Specifically, the land ratio Lam2 is more than 105%, preferably not less than 106%, but less than 120% of the land ratio Las2.

As shown in FIG. 4, the inner rubber 10 is preferably made of an air impermeable rubber material.

Examples of such rubber material include butyl-based rubber materials and halogenated butyl-based rubber materials.

In the inner rubber 10 in this embodiment, the first portion 11 and the second portion 12 are made of the same rubber material.

The inner rubber 10 is not limited to such example, and may be made of a plurality of rubber materials, for example.

The first portion 11 of the inner rubber 10 in the present embodiment comprises a first end portion 13 on the axially outer side which is on the first tread edge T1 side, and a second end portion 14 on the axially outer side which is on the second tread edge T2 side.

It is preferable that the first end portion 13 has the first thickness t1 continuously decreasing toward the axially outer end 11a of the first portion 11.

Similarly, the second end portion 14 has the first thickness t1 continuously decreasing toward the axially outer end 11b of the first portion 11.

In the present embodiment, therefore, the positions at which the first thickness t1 has finished decreasing, correspond to the axially outer ends 11a and 11b of the first portions 11.

Such first portions 11 suppresses stress concentration at the axially outer ends 11a and 11b, and help to improve the durability performance of the tire 1.

From the viewpoint of reliably reducing the vehicle interior noise, the axially outer end 11a on the first tread edge T1 side of the first portion 11 in the present embodiment is positioned, for example, on the first tread edge T1 side of the first crown circumferential groove 23, more preferably, positioned on the first tread edge T1 side of the first shoulder circumferential groove 21.

It is preferable that the axially outer end 11a of the first portion 11 is positioned so as to overlap, in the tire axial direction, with the third arc 2d (shown in FIG. 2) of the ground contacting surface 2s.

Figure 6:
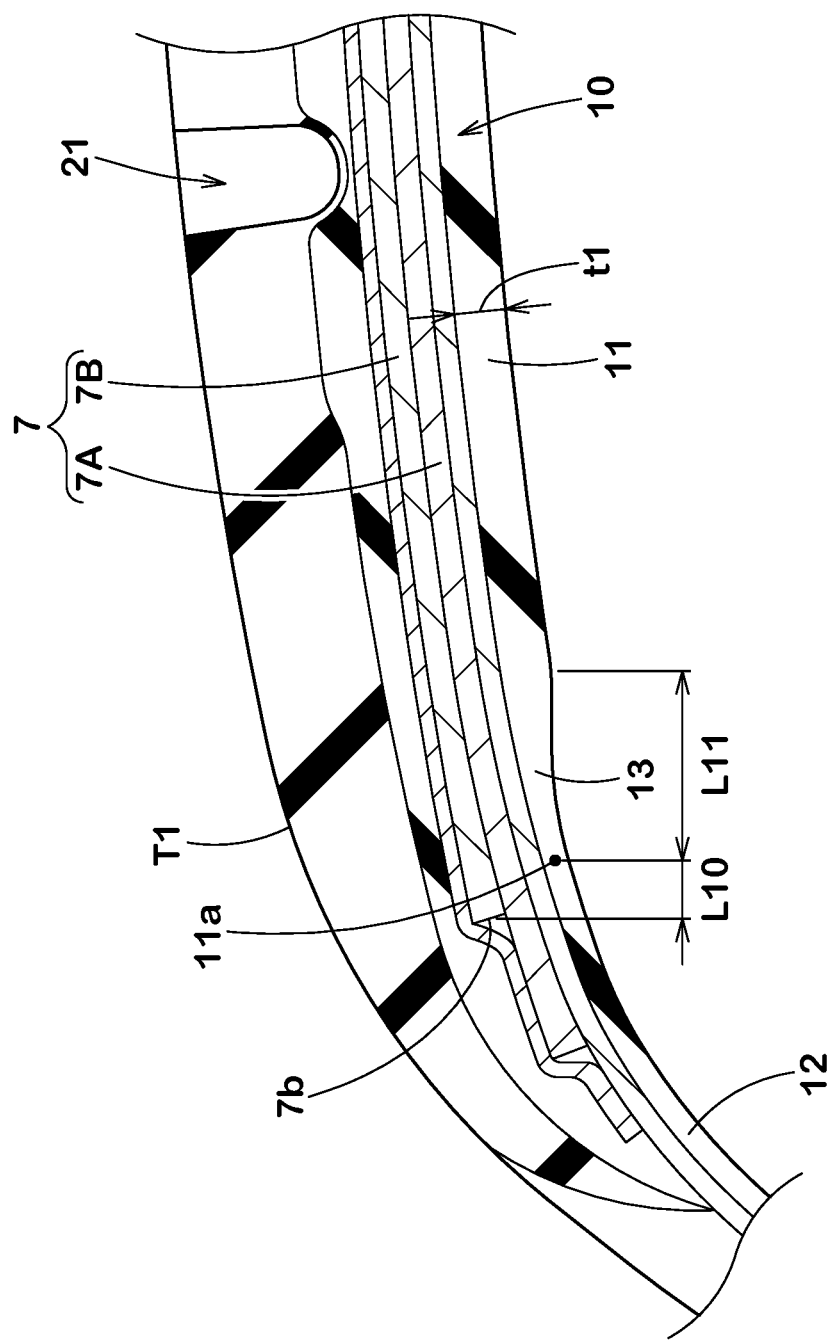
FIG. 6 is an enlarged cross-sectional view of the first end portion of the first portion of FIG. 1.

In FIG. 6, there is shown an enlarged cross-sectional view of the first end portion 13 of the first portion 11.

As shown in FIG. 6, it is preferable that the axially outer end 11a on the first tread edge T1 side, of the first portion 11 is located at the same position in the tire axial direction as the axially outer edge 7b of the second belt ply 7B, or on the inner side in the tire axial direction of the axially outer edge 7b of the second belt ply 7B.

It is preferable that the distance L10 in the tire axial direction between the axially outer end 11a of the first portion 11 and the axially outer edge 7b of the second belt ply 7B is 10 mm or less.

Thereby, in the first portion 11 in the present embodiment, the entire first end portion 13 is located on the first tread edge T1 side of the first shoulder circumferential groove 21.

As a result, while securing a sufficient length in the tire axial direction of the first portion 11, deformation around the axially outer end 11a of the first portion 11 can be suppressed by the belt layer 7. Thereby, separation of the inner rubber 10 occurring around the axially outer end 11a can be suppressed.

The first end portion 13 is continuous with a portion extending with a constant first thickness t1 on the tire equator C side as shown in FIG. 1.

The axial length L11 (shown in FIG. 6) of the first end portion 13 is 2.0% to 4.0% of the tread width TW.

Thereby, the thickness of the inner rubber 10 can be prevented from changing abruptly, and failure such as separation of the inner rubber 10 can be suppressed.

As shown in FIG. 4, the first portion 11 on the second tread edge T2 side has the same configuration as that on the first tread edge T1 side.

That is, the axially outer end 11b on the second tread edge T2 side of the first portion 11 is located, for example, on the second tread edge T2 side of the second crown circumferential groove 24, more preferably located on the second tread edge T2 side of the second shoulder circumferential groove 22.

Further, in the present embodiment, the entire second end portion 14 is located on the second tread edge T2 side of the second shoulder circumferential groove 22.

Further, it is preferable that the axially outer end 11b on the second tread edge T2 side of the first portion 11 is positioned so as to overlap, in the tire axial direction, with the third arc of the ground contacting surface 2s which is an arc obtained by inverting the third arc 2d on the first tread edge T1 side shown in FIG. 2 to the second tread edge T2 side. Further, it is preferable that the axially outer end 11b of the first portion 11 on the second tread edge T2 side is located at the same position in the tire axial direction as the axially outer edge 7b of the second belt ply 7B, or axially inside the axially outer edge 7b of the second belt ply 7B.

Further, the distance in the tire axial direction between the axially outer end 11b of the first portion 11 and the axially outer edge 7b of the second belt ply 7B is 10 mm or less. Further, the second end portion 14 has the same configuration as the first end portion 13.

It is preferable that, by arranging the axially outer ends 11a and 11b of the first portions 11 as described above, the axial length L5 of the first portion 11 in this embodiment is set in a range from 90% to 110% of the tread width TW.

Thereby, it is possible to reliably reduce the vehicle interior noise, while suppressing an increase in tire weight.

In the first portions 11 in this embodiment, the first length L6 from the tire equator C to the axially outer end 11a on the first tread edge T1 side, and the second length L2 from the tire equator C to the axially outer end 11b on the second tread edge T2 side, are substantially the same.

More specifically, the difference between the first length L6 and the second length L7 is 5% or less of the first length L6. Thereby, the uniformity of the tire can be improved. However, it may be possible that the second length L7 is more than the first length L6, for example. Specifically, the second length L7 may be in a range from 105% to 110% of the first length L6.

In such arrangement, the length of the first portion 11 is sufficiently secured on the second tread edge T2 side which is inboard of the vehicle when the tire is attached to the vehicle, therefore, it is possible to further reduce the vehicle interior noise.

The first portion 11 extends between the first end portion 13 and the second end portion 14 with a constant first thickness t1.

Thereby, the first thickness t1 is substantially the same at the position of the tire equator C, and at a position on the first tread edge T1 side of the first shoulder circumferential groove 21.

Preferably, the first thickness t1 is substantially the same from the tire equator C to a position beyond the first shoulder circumferential groove 21.

Here, the expression "substantially the same" means that the thickness may include inevitable errors in rubber products or tires, and the difference between the maximum thickness and minimum thickness is 5% or less of the maximum thickness.

The first portion 11 may have a region extending to the first tread edge T1 with a constant first thickness t1.

In other words, the first thickness t1 may be substantially the same from the position of the tire equator C to a position of the first tread edge T1 (to an imaginary line extending parallel to the tire radial direction through the first tread edge T1).

In this case, the axially outer end 11a of the first portion 11 is located outside the first tread edge T1 in the tire axial direction. Such first portion 11 can further reduce the vehicle interior noise.

It is preferable that the first portion 11 between the tire equator C and the second tread edge T2 has the same configuration as described above. That is, the first thickness t1 is substantially the same at the position of the tire equator C and at a position on the second tread edge T2 side of the second shoulder circumferential groove 22. Preferably, the first thickness t1 is substantially the same from the tire equator C to a position beyond the second shoulder circumferential groove 22.

However, the first portion 11 may have a region extending to the second tread edge T2 with a constant first thickness t1.

The length L8 in the tire axial direction of the portion of the first portion 11 having the constant first thickness t1 (shown in FIG. 1, and the same applies hereinafter) is preferably in a range from 82% to 106% of the tread width TW.

By setting the length L8 of the portion having the constant first thickness t1 to not less than 82% of the tread width TW, vibrations of the tread portion 2 can be effectively suppressed. From this point of view, it is more preferable that the length L8 of the portion having the constant first thickness t1 is not less than 85%, still more preferably not less than 88% of the tread width TW.

By setting the length L8 of the portion having the constant first thickness t1 to not more than 106% of the tread width TW, an excessive weight increase can be reliably suppressed.

From this point of view, it is more preferable that the length L8 of the portion having the constant first thickness t1 is not more than 103%, still more preferably not more than 100% of the tread width TW.

The length L8 of the portion having the constant first thickness t1 corresponds to the distance in the tire axial direction between the first end portion 13 and the second end portion 14.

As shown in FIG. 4, the average value of the first thickness t1 is preferably in a range from 1.5 to 3.5 times the average value of the second thickness t2.

As the average value of the first thickness t1 is not less than 1.5 times the average value of the second thickness t2, vibrations of the tread portion 2 can be effectively suppressed, and the noise performance of the tire 1 can be improved.

From this point of view, it is more preferable that the average value of the first thickness t1 is not less than 1.75 times, still more preferably not less than 1.9 times the average value of the second thickness t2.

As the average value of the first thickness t1 is not more than 3.5 times the average value of the second thickness t2, an excessive weight increase can be suppressed, and the good fuel efficiency performance of the tire 1 can be maintained.

From this point of view, it is more preferable that the average value of the first thickness t1 is not more than 2.7 times, still more preferably not more than 2.2 times the average value of the second thickness t2.

The average value of the first thickness t1 is preferably 2.0 to 4.5 mm.

As the average value of the first thickness t1 is 2.0 mm or more, vibrations of the tread portion 2 can be effectively suppressed, and the noise performance of the tire 1 can be improved.

From this point of view, it is more preferable that the average value of the first thickness t1 is 2.5 mm or more.

As the average value of the first thickness t1 is 4.5 mm or less, an excessive weight increase can be suppressed, and the good fuel efficiency performance of the tire 1 can be maintained.

From this point of view, it is more preferable that the average value of the first thickness t1 is 4.0 mm or less, even more preferably 3.5 mm or less.

The average value of the second thickness t2 is preferably 0.5 to 2.0 mm.

As the average value of the second thickness t2 is 0.5 mm or more, good air impermeability can be maintained, which helps to improve the durability performance of the tire 1.

From this point of view, it is more preferable that the average value of the second thickness t2 is 1.0 mm or more.

As the average value of the second thickness t2 is 2.0 mm or less, an excessive weight increase can be suppressed, and the good fuel efficiency performance of the tire 1 can be maintained.

From this point of view, it is more preferable that the average value of the second thickness t2 is 1.5 mm or less.

It has been confirmed by the inventors of the present disclosure that, by setting the twist coefficient K of the carcass cord 6B to 2000 to 2500, and the first thickness t1 of the first portion 11 to 2.0 mm to 4.5 mm as described above, the vehicle interior noise in a medium frequency range from 160 Hz to 350 Hz and in a high frequency range of 350 Hz or higher is reduced.

Further, it has been confirmed by the inventors that, by setting the twist coefficient K of the carcass cords 6B to 2000 to 2500, and the first thickness t1 of the first portion 11 to 2.0 mm to 3.5 mm, the rolling resistance is not deteriorated.

Figure 7:
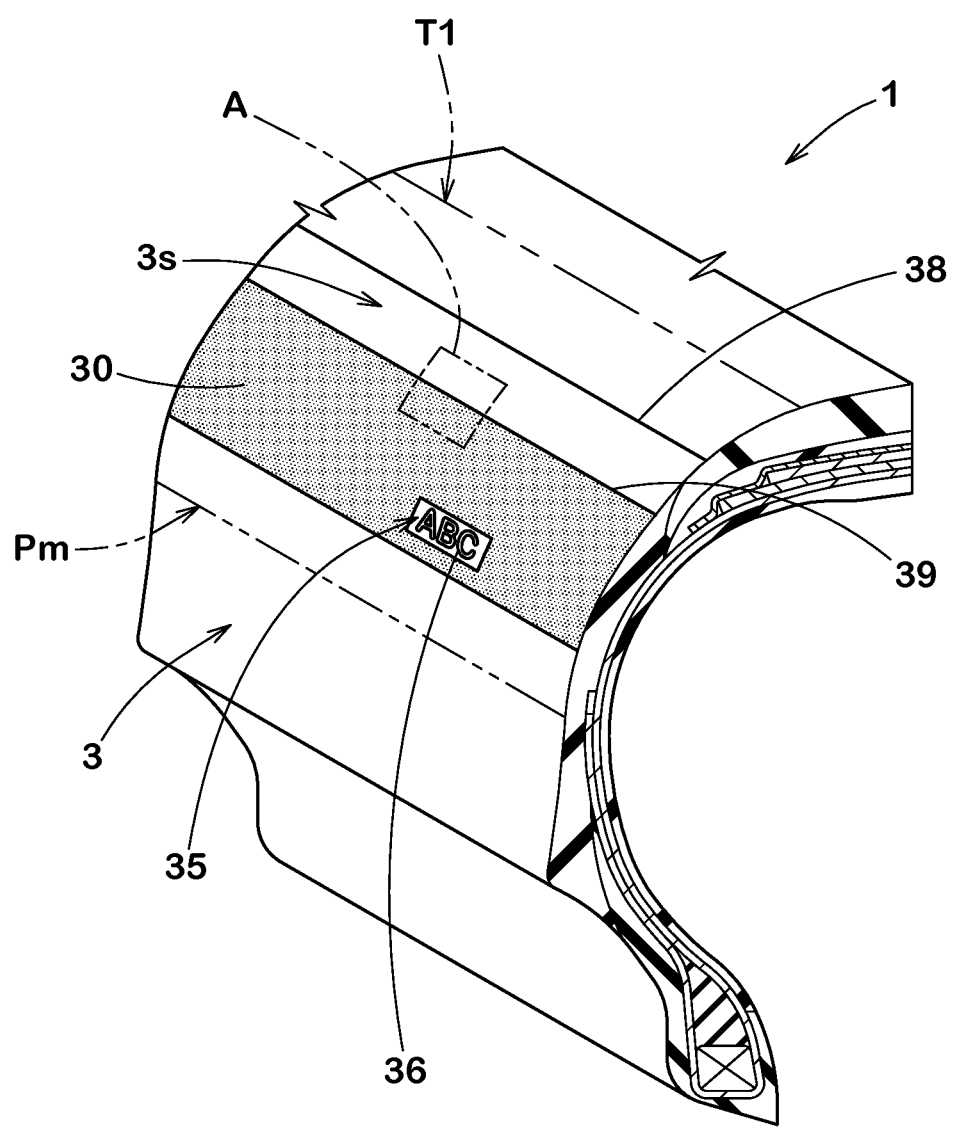
FIG. 7 is an enlarged perspective partial view of the sidewall portion of FIG. 1.

FIG. 7 is an enlarged perspective view of the sidewall portion 3.

As shown in FIG. 7, the outer surface 3s of the sidewall portion 3 in the present embodiment has a serration portion 30 positioned outside the tire maximum width position Pm in the tire radial direction.

In this embodiment, the outer surface of each of the sidewall portions 3 includes the serration portions 30.

In FIG. 3, the area where the serration portion 30 is arranged is dotted.

The serration portion 30 occupies at least part of the outer surface of the sidewall portion 3. The serration portion 30 may be arranged intermittently in the tire circumferential direction, or may be arranged continuously over the entire circumference of the tire.

Figure 8:
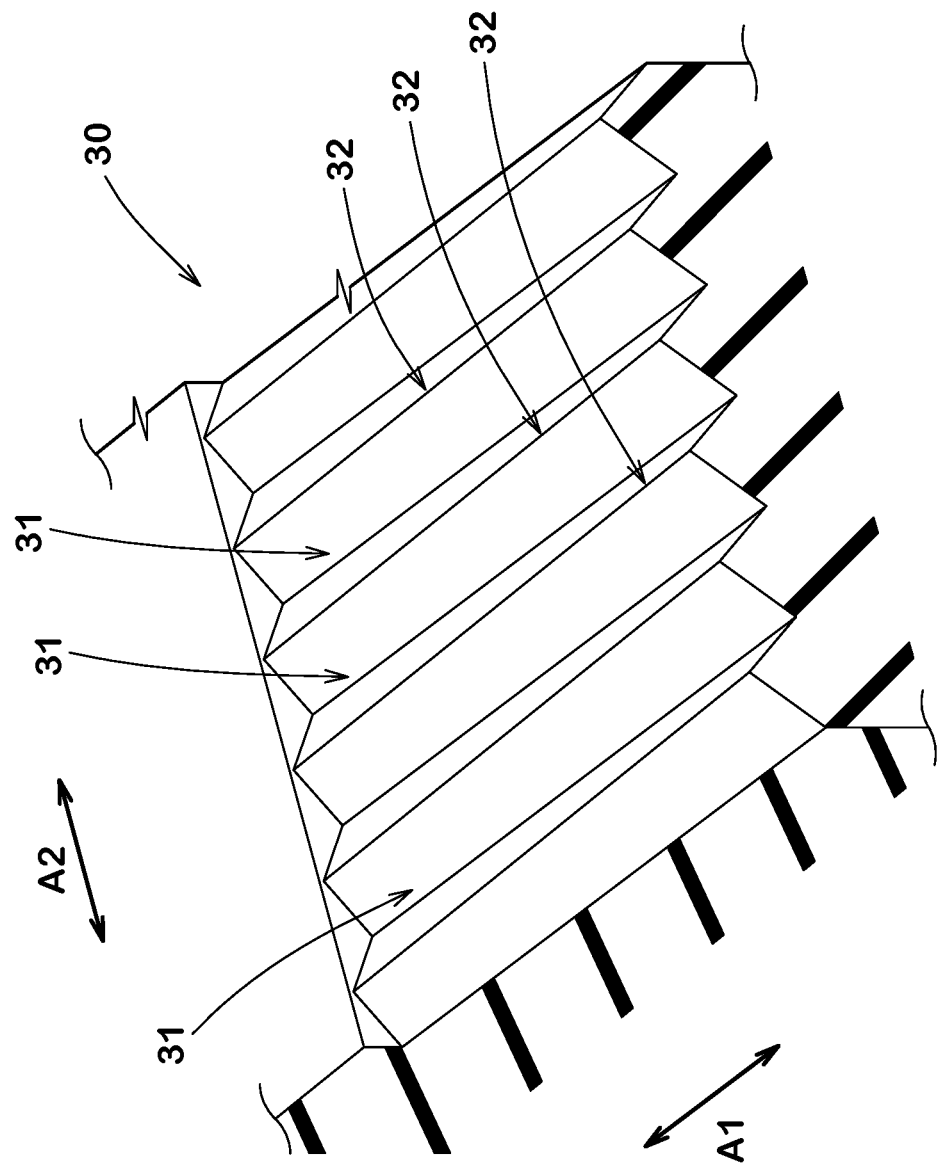
FIG. 8 is an enlarged perspective view of area A in FIG. 7.

FIG. 8 shows an enlarged perspective view of area A in FIG. 7.

In FIG. 8, arrow A1 corresponds to the tire radial direction, and arrow A2 corresponds to the tire circumferential direction.

As shown in FIG. 8, the serration portion 30 comprises a plurality of grooves 31 extending in the tire radial direction and arranged in the tire circumferential direction, and a plurality of ridges 32 divided by the plurality of grooves 31.

Each ridge 32 is formed between two adjacent grooves 31 and extends like a rib.

The groove 31 extending in the tire radial direction means that the maximum angle of the center line of the groove 31 with respect to the tire radial direction is less than 45 degrees.

Such serration portion 30 helps to make the bulge and dent of the sidewall portion 3 which are inevitable in tire manufacturing, inconspicuous.

Hereinafter, such effect may be expressed as "the appearance performance is improved". On the other hand, the serration portion 30 tends to generate noise (wind noise) when the vehicle is running.

Figure 9:
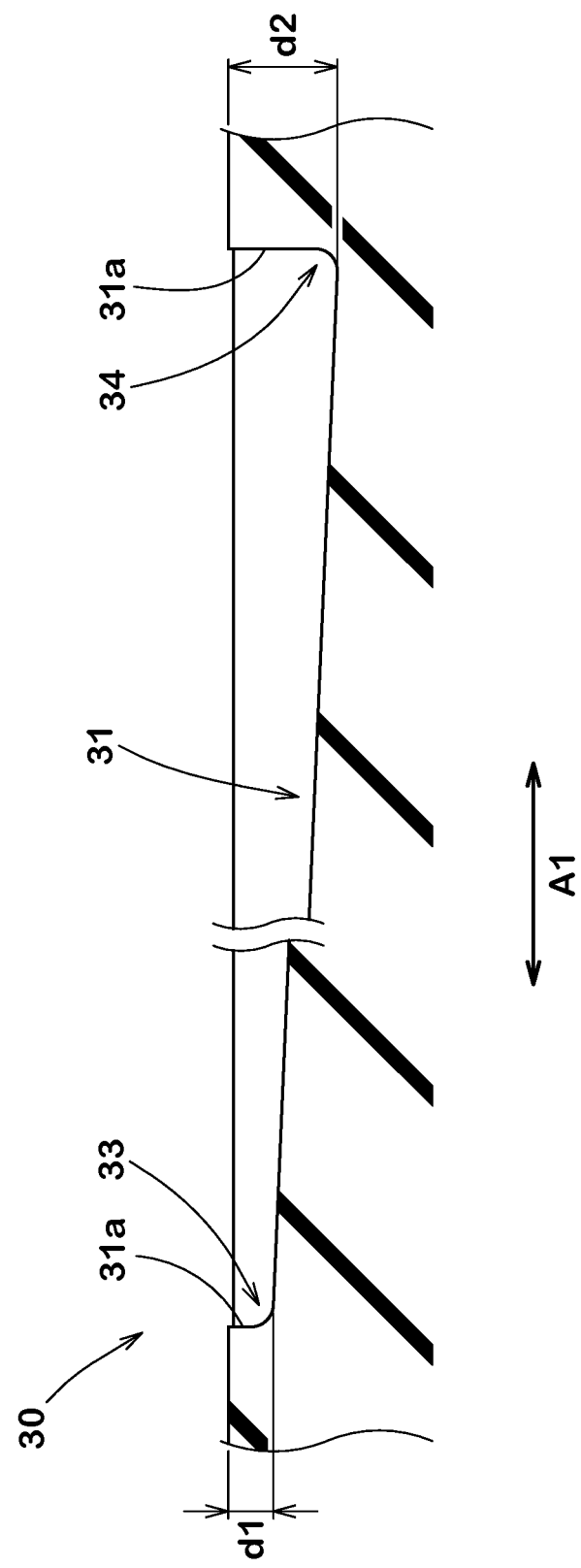
FIG. 9 is an enlarged cross-sectional view taken along the length direction of one of the grooves in FIG. 8.

FIG. 9 shows a cross-sectional view of the groove 31 of the serration portion 30 taken along the length direction of the groove.

Each groove 31 includes an outer end portion 33 and an inner end portion 34 in the tire radial direction as shown in FIG. 9.

The outer end portion 33 is an end portion of the groove 31 on the tread portion 2 side (shown in FIG. 1), and the inner end portion 34 is an end portion of the groove 31 on the bead portion 4 side (shown in FIG. 1).

In this embodiment, the outer end portion 33 and the inner end portion 34 each have an inner walls 31a extending in the depth direction of the groove 31.

In this embodiment, each of the plurality of grooves 31 has a depth d1 of 0.2 mm or less at the outer end portion 33.

In this embodiment, the noise performance can be improved owing to that the first thickness t1 (shown in FIG. 1) of the first portion 11 of the inner rubber 10 is large, and that the depths of the plurality of grooves 31 at the outer end portions 33 are defined. The reason is as follows.

In general, when a serration portion is provided on the sidewall portion, noise (wind noise) tends to occur due to friction between the air and the serration portion during the tire is rotation.

In the radially outer end portions of the grooves which constitute the serration portion, as compared to the other portions of the grooves, a higher velocity of the air hits the tire when the tire is rotating, and is likely to generate the noise.

However, in this embodiment, by setting the depth of the outer end portions 33 of the grooves 31 constituting the serration portion 30 to 0.2 mm or less, the noise can be reduced, and both the vehicle exterior noise and the vehicle interior noise can be reduced.

Furthermore, in the tire 1 of the present embodiment, as the first thickness t1 (shown in FIG. 1) of the first portion 11 is large as described above, the tread portion 2 can effectively absorb vibrations from the road surface, and it is possible to further reduce the vehicle interior noise.

For these reasons, the tire 1 of the present embodiment can exhibit excellent noise performance.

As shown in FIG. 8, the grooves 31 and the ridges 32 of the serration portion 30 extend linearly, for example.

The grooves 31 and the ridges 32 of the serration portion 30 preferably extend at an angle of 15 degrees or less, more preferably 5 degrees or less with respect to the tire radial direction. However, the present embodiment is not limited to such an aspect.

It is preferable that the depth of the groove 31 decreases from the inner end portion 34 to the outer end portion 33 as shown in FIG. 9.

Preferably, the depth of the groove 31 is continuously decreased. Therefore, the depth d2 at the inner end portion 34 constitutes the maximum depth of the groove 31.

The serration portion 30 having such grooves 31 can improve the appearance performance and noise performance in a well-balanced manner.

Moreover, the serration portion 30 configured with such grooves 31 is also useful for reducing the air resistance of the tire.

The depth d2 of the inner end portion 34 is, for example, 0.3 mm or more.

The depth d2 of the inner end portion 34 is preferably 1.0 mm or less, more preferably 0.8 mm or less, still more preferably 0.5 mm or less.

The depth d2 of the inner end portion 34 is preferably not less than 1.5 times, more preferably not less than 3.0 times, still more preferably not less than 5.0 times, but preferably not more than 10.0 times, more preferably not more than 9.0 times, still more preferably not more than 8.0 times the depth d1 of the outer end portion 33.

The groove 31 having such outer end portion 33 and inner end portion 34 can improve the appearance performance and noise performance in a well-balanced manner.

More preferably, the depth d2 of the inner end portion 34 is smaller than the difference between the average value of the first thickness t1 (shown in FIG. 1) of the first portion 11 of the inner rubber 10, and the average value of the second thickness t2 (shown in FIG. 1) of the second portion 12.

Thereby, the vibration absorption capacity of the tread portion 2 is sufficiently increased compared to the noise generated by the serration portion 30, therefore, the noise performance can be further improved.

Figure 10:
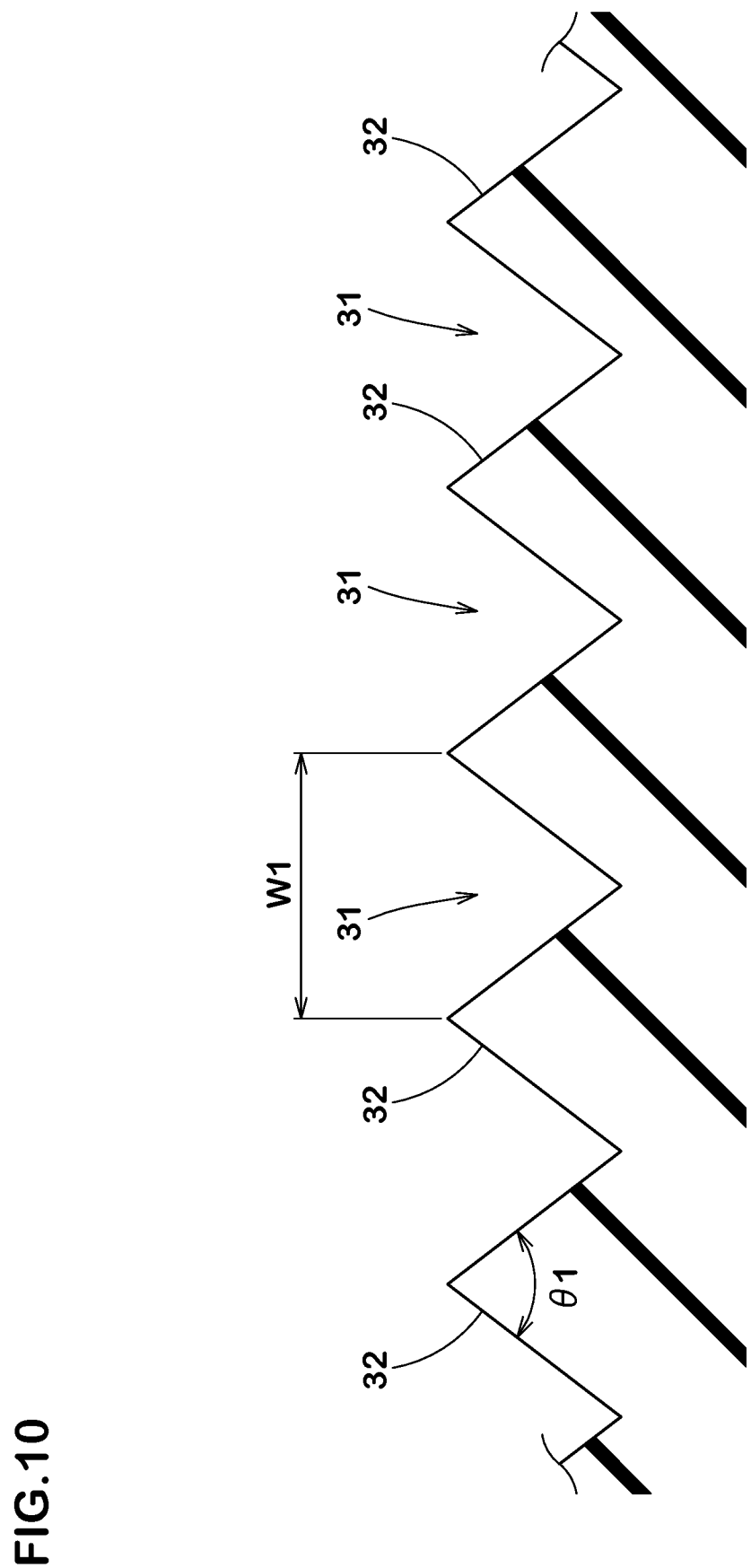
FIG. 10 is an enlarged cross-sectional view taken orthogonally to the longitudinal directions of the grooves and ridges in FIG. 8.

In FIG. 10, there is shown a cross-sectional view perpendicular to the longitudinal directions of the plurality of grooves 31 and ridges 32.

As shown in FIG. 10, the groove width W1 of the groove 31 is, for example, 0.6 to 1.8 mm. Thereby, the appearance performance and noise performance are improved in a well-balanced manner.

The cross-sectional shape of the ridge 32 is, for example, triangular.

The apex angle θ1 of the ridge 32 is, for example, 60 to 90 degrees.

The maximum height of the ridge 32 is, for example, 0.1 to 1.0 mm.

The cross-sectional shape of the ridge 32 is not limited to such triangular shape, and various shapes such as a trapezoidal shape and a semi-circular shape can be employed.

As shown in FIG. 7, the outer surface of the sidewall portion 3 comprises at least one mark portion 35 including at least one letter, figure or symbol.

In FIG. 7, as an example of the mark portion 35, the mark portion 35 consisting of the characters "ABC" is shown, for example.

The mark portion 35 in this embodiment is arranged within the serration portion 30.

It is preferable that the mark portion 35 is formed by fine grooves 36 having a depth smaller than that of the inner end portions 34 (shown in FIG. 9) of the grooves 31. Specifically, the depths of the fine grooves 36 are, for example, 0.2 to 0.8 mm.

Thereby, a contrast is generated between the mark portion 35 and the serration portion 30, and it is possible to improve the visibility of the mark portion 35.

In some cases, the outer surface of the sidewall portion 3 is provided with a stepped portion 38 extending in the tire circumferential direction and having a minute height in the normal direction to the tire outer surface.

The stepped portion 38 corresponds to a split portion or line of a split mold for vulcanization molding, which is formed, for example, between the tread segment and the sidewall plate.

In FIG. 7, the stepped portion 38 is indicated by thin line, omitting the height appearing in the cross section.

It is desirable that the height of the stepped portion 38 is 0.7 mm or less.

Thereby, air resistance generated by the stepped portion 38 is reduced, and an improvement in noise performance as well as an improvement in fuel efficiency can be expected.

Further, the stepped portion 38 may be arranged at the boundary 39 between the serration portion 30 and other portions.

Thereby, it is possible to further improve the appearance of the sidewall portion 3.

Furthermore, the serration portion 30 may be arranged to overlap the stepped portion 38.

Thereby, such serration portion 30 can make uneven shapes by such as the split lines and the bulge and dent, inconspicuous, and it is possible to further improve the appearance performance of the tire 1.

Figure 11:
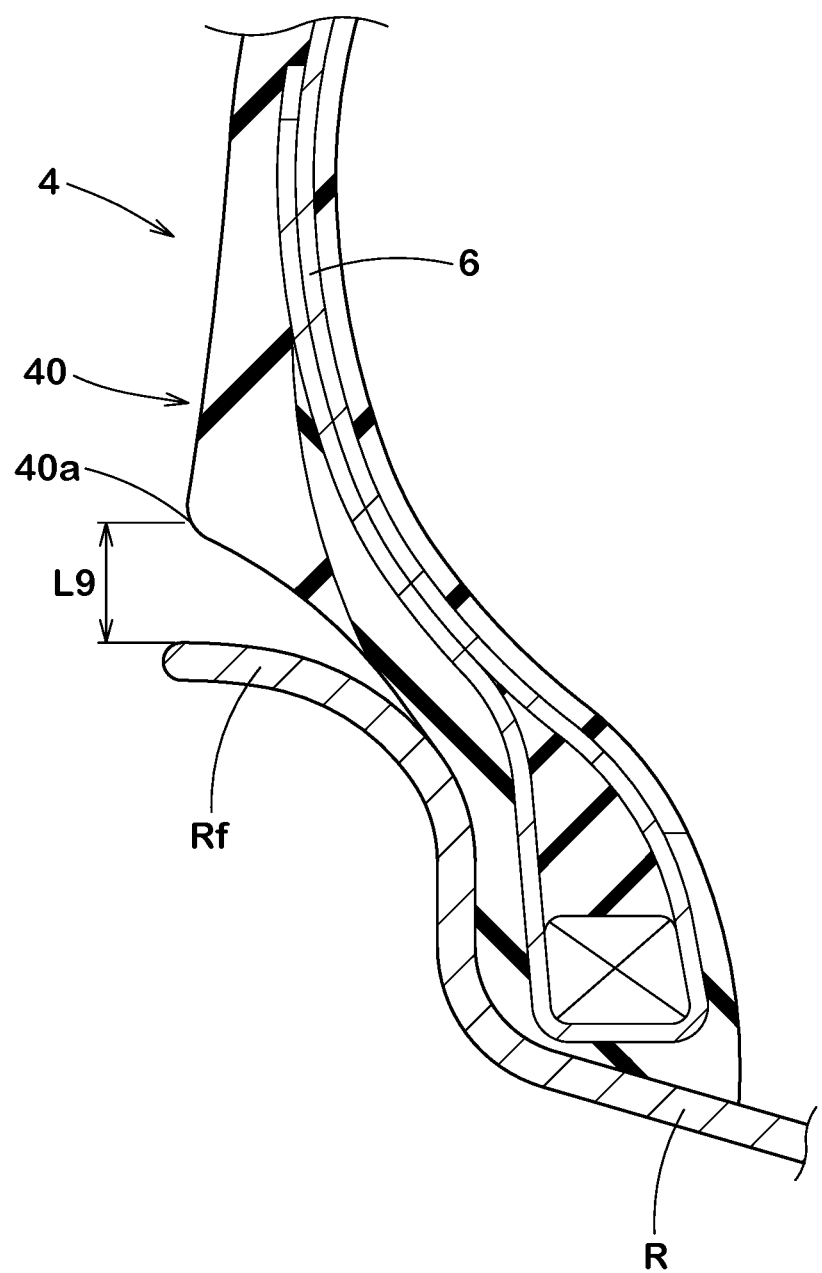
FIG. 11 is an enlarged cross-sectional view of one of the bead portions when the tire is mounted on a regular rim.

In FIG. 11, there is shown an enlarged view of the bead portion 4 of the tire 1 under the normal state when mounted on the regular rim R.

At least one of the bead portions 4 in this embodiment is provided with a rim guard 40 as shown in FIG. 11. Preferably, each of the bead portions 4 is provided with the rim guard 40.

The rim guard 40 is a rubber member having a triangular cross-section and protruding axially outward from the carcass 6.

The rim guard 40 prevents the rim flange Rf from coming into contact with curbs and the like when the tire is running.

In this embodiment, the distance L9 in the tire radial direction from the radially outer end of the rim flange Rf of the regular rim R to the vertex 40a in the tire axial direction of the rim guard 40 is 1.0 to 10.0 mm.

Thereby, while protecting the rim flange Rf, air turbulence is less likely to occur between the rim guard 40 and the rim flange Rf, and the noise performance can be improved.

Figure 12:
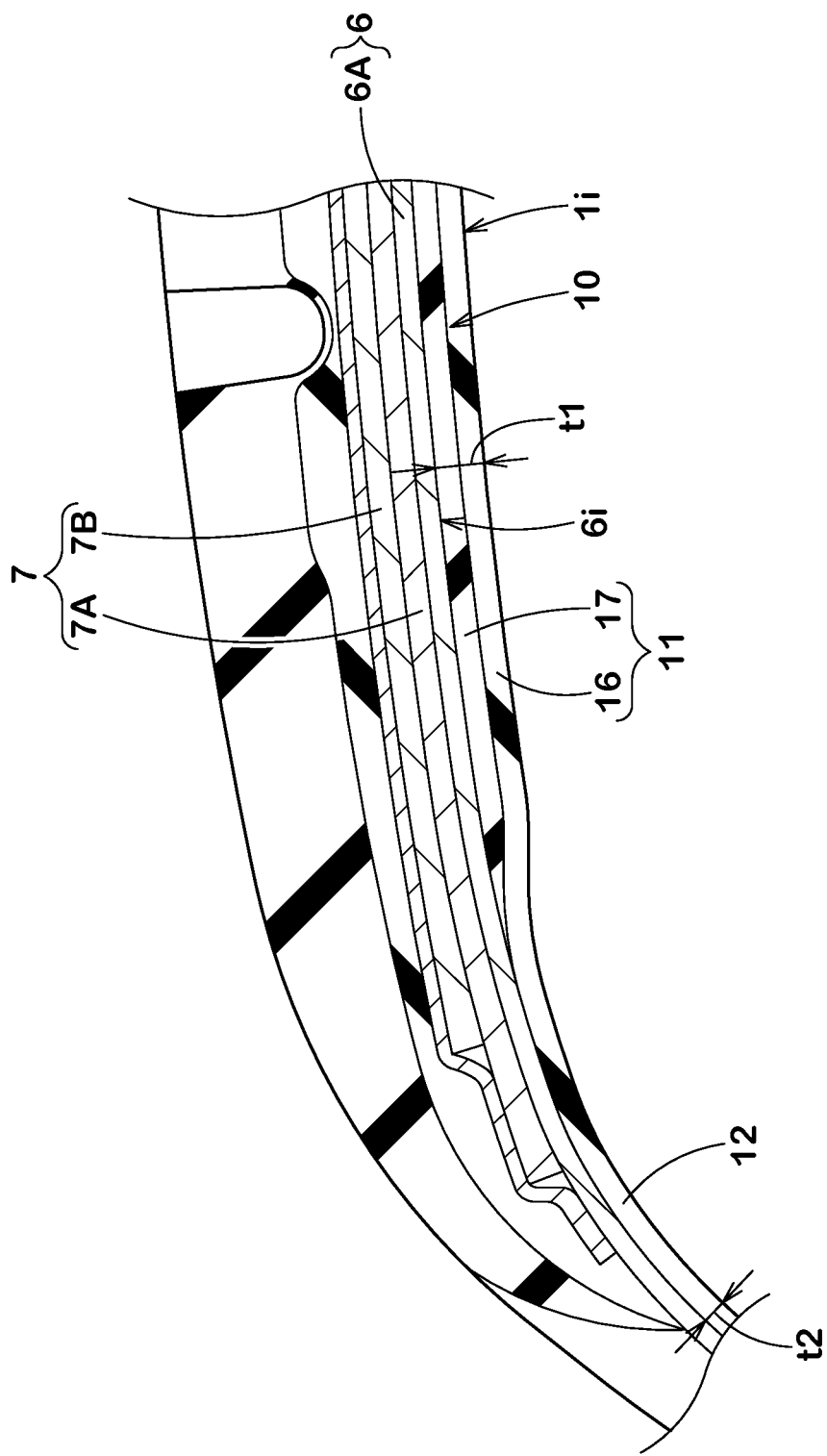
FIG. 12 is an enlarged cross-sectional partial view of a second modified example of the inner rubber.

FIG. 12 is an enlarged cross-sectional view of the inner rubber 10 as a second example.

The same reference numerals are given to the same elements as in the above-described first example of the inner rubber 10, and the description thereof is omitted.

As shown in FIG. 12, the first portion 11 of the inner rubber 10 of the second example comprises an inner liner layer 16 made of an air impermeable rubber material, and an additional layer 17 disposed between the inner liner layer 16 and the carcass 6.

The additional layer 17 of the second example is composed of a rubber material different from that of the inner liner layer 16.

The additional layer 17 is composed of, for example, a rubber material having excellent adhesion to the carcass 6.

Such additional layer 17 prevents contact between the carcass 6 and the inner liner layer 16, thereby improving the durability performance of the tire 1.

The additional layer 17 may be composed of, for example, an air-permeable rubber material.

In such inner rubber 10, a wide variety of materials can be selected for the additional layer 17, which is suitable for achieving various performances at low cost.

In this example, as the additional layer 17 is included in the first portion 11, various performances can be improved.

For example, a rubber material having a loss tangent tan δ at 70 degrees C. which is larger than the first rubber material forming the inner liner layer 16, may be used as the second rubber material forming the additional layer 17. In such example, the tread portion 2 can further absorb vibrations from the road surface, and the vehicle interior noise can be further reduced.

For the additional layer 17, for example, a rubber material having a loss tangent tan δ at 70 degrees C. which is larger than that of the inner liner layer 16, can be used.

In this case, the above-mentioned loss tangent tan δ1 of the first portion 11 is the weighted average which is obtained by weighting the loss tangent tan δ of the inner liner layer 16 and the loss tangent tan δ of the additional layer 17 by their cross-sectional areas.

The above-mentioned loss tangent tan δ2 of the second portion 12 corresponds to the loss tangent tan δ of the inner liner layer 16.

Such additional layer 17 can more reliably reduce vibrations of the tread portion 2 and improve the noise performance of the pneumatic tire 1.

It is preferable that the loss tangent tan δ at 70 degrees C. of the above-mentioned rubber material having air impermeability is 0.14 or more.

The loss tangent tan δ of the rubber material having air impermeability can be measured as described above.

As the loss tangent tan δ at 70 degrees C. of the rubber material having air impermeability is 0.14 or more, it is possible to further suppress vibrations of the tread portion 2.

Figure 13:
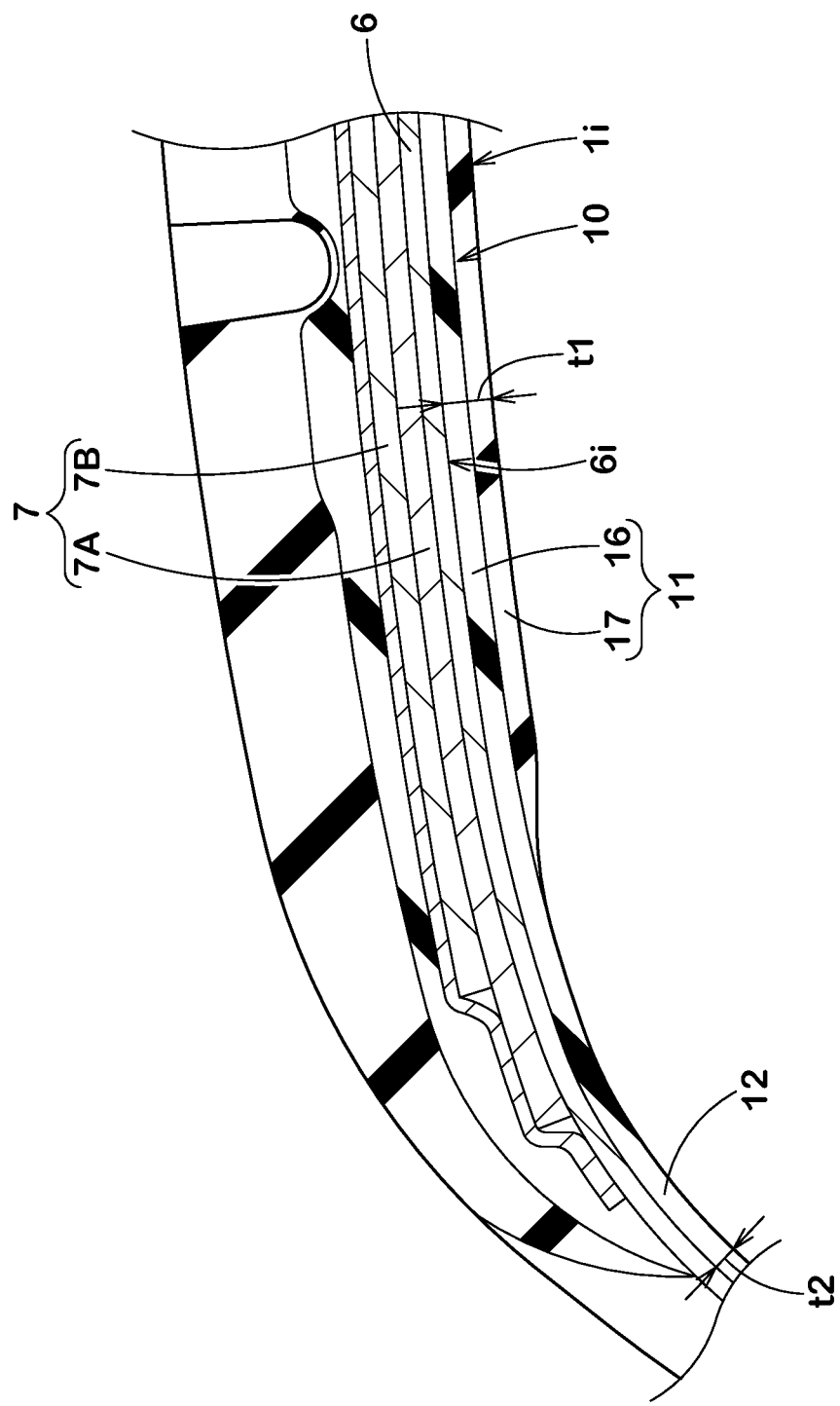
FIG. 13 is an enlarged cross-sectional partial view of a third modified example of the inner rubber.

FIG. 13 is an enlarged cross-sectional view of the inner rubber 10 as a third example. The same reference numerals are given to the same elements as in the above-described examples, and the description thereof is omitted.

As shown in FIG. 13, the additional layer 17 in this example is arranged on the inside in the tire radial direction of the inner liner layer 16.

The additional layer 17 in this example forms part of the tire inner cavity surface 1i.

In the inner rubber 10 of the third example, similarly to the inner rubber 10 of the second example, a wide variety of materials can be selected for the additional layer 17, which is suitable for achieving various performances at low cost.

Even when the first portion 11 of the inner rubber 10 comprises the additional layer 17 as shown in FIGS. 12 and 13, the first thickness t1 is the thickness from the inner surface 6i of the carcass 6 in the tread portion 2 to the tire inner cavity surface 1i, excluding the topping rubber of the carcass ply 6A (shown in FIG. 1).

Figure 14:
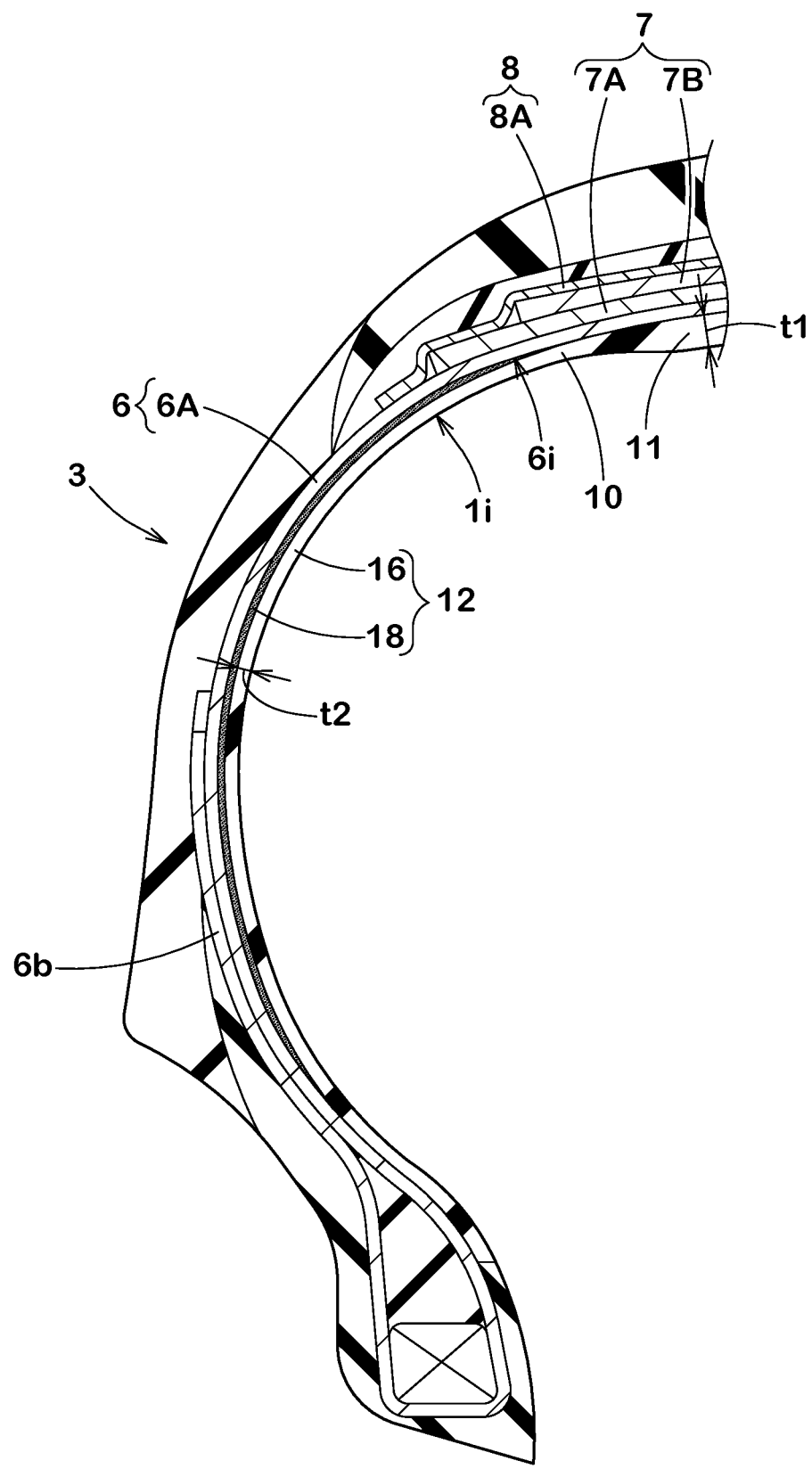
FIG. 14 is an enlarged cross-sectional partial view of a fourth modified example of the inner rubber.

FIG. 14 is an enlarged cross-sectional view of the inner rubber 10 as a fourth example. The same reference numerals are given to the same elements as in the above-described examples, and the description thereof is omitted.

As shown in FIG. 14, the second portion 12 of the inner rubber 10 of the fourth example comprises an inner liner layer 16 made of a rubber material having air impermeability, and an intermediate layer 18 disposed between the inner liner layer 16 and the carcass 6.

The intermediate layer 18 of the fourth example is composed of a rubber material different from that of the inner liner layer 16.

The intermediate layer 18 may be composed of the same rubber material as the additional layer 17 (shown in FIGS. 12 and 13), or may be composed of a different rubber material from the additional layer 17, for example.

In such inner rubber 10, a wide variety of materials can be selected for the intermediate layer 18, which is suitable for achieving various performances at low cost.

The intermediate layer 18 overlaps with the band layer 8 in the tire axial direction, for example.

The intermediate layer 18 of the fourth example overlaps with the belt layer 7 in the tire axial direction.

The intermediate layer 18 may be continuous with the first portion 11 of the inner rubber 10, for example.

It is preferable that the intermediate layer 18 overlaps, in the tire radial direction, with the turnup portion 6b of the carcass 6.

Such intermediate layer 18 helps to suppress vibrations of the sidewall portion 3 and can improve the noise performance of the pneumatic tire 1.

Even when the second portion 12 of the inner rubber 10 comprises the intermediate layer 18, the second thickness t2 is the thickness from the inner surface 6i of the carcass 6 in the sidewall portion 3 to the tire inner cavity surface 1i, excluding the topping rubber of the carcass ply 6A.

While detailed description has been made of preferable embodiments of the present disclosure, the present disclosure can be embodied in various forms without being limited to the above-described embodiments.

EXAMPLES

Based on the structure shown in FIG. 1, pneumatic tires were experimentally manufactured as test tires based on the specifications shown in Table 1.

The test tires were tested for the fuel efficiency performance and noise performance. Main common specifications and test methods are as follows.

<Common Specifications>
Tire size: 205/55R16
Air pressure: 230 kPa
Applied load: 4.2 kN
Loss tangent tan δ2 of the second part: 0.14
<Low Fuel Consumption Performance Test>
Each test tire was mounted on a rolling resistance tester, and the rolling resistance was measured when running at 50 km/h.

The results are indicated by an index based on Reference example being 100, wherein the larger the number, the smaller the rolling resistance and the better the fuel economy performance.

<Noise Performance Test>
Each test tire was mounted on a bench noise tester set in an anechoic chamber, and the sound pressure was measured when running at 50 km/h, and converted into an index in which the lower the sound pressure, the larger the numerical value.

The results are indicated by an index based on Reference example being 100, wherein the larger the numerical value, the smaller the sound pressure and the better the noise performance.

The test results are shown in Table 1.

TABLE 1

|  | Reference example | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| first thickness/second thickness | 1.0 | 2.0 | 2.0 | 2.0 | 2.0 | 2.0 | 2.0 | 2.0 | 2.0 | 2.0 | 2.0 | 2.0 |
| loss tangent tan δ1 of first portion | 0.14 | 0.14 | 0.14 | 0.14 | 0.15 | 0.20 | 0.14 | 0.14 | 0.14 | 0.14 | 0.14 | 0.14 |
| loss tangent tan δA of cap rubber | 0.30 | 0.30 | 0.25 | 0.20 | 0.30 | 0.30 | 0.30 | 0.30 | 0.30 | 0.30 | 0.30 | 0.30 |
| loss tangent tan δB of base rubber | 0.21 | 0.21 | 0.21 | 0.21 | 0.21 | 0.21 | 0.20 | 0.21 | 0.21 | 0.21 | 0.21 | 0.21 |
| loss tangent tan δC of topping rubber of carcass ply | 0.16 | 0.16 | 0.16 | 0.16 | 0.16 | 0.16 | 0.16 | 0.15 | 0.16 | 0.16 | 0.16 | 0.16 |

TABLE 1-continued

|  | Reference example | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| loss tangent tanδD of topping rubber of belt ply | 0.16 | 0.16 | 0.16 | 0.16 | 0.16 | 0.16 | 0.16 | 0.16 | 0.15 | 0.16 | 0.16 | 0.16 |
| loss tangent tanδF of topping rubber of band ply | 0.16 | 0.16 | 0.16 | 0.16 | 0.16 | 0.16 | 0.16 | 0.16 | 0.16 | 0.15 | 0.16 | 0.16 |
| complex elastic modulus E*A of tread rubber | 7.8 | 7.8 | 7.8 | 7.8 | 7.8 | 7.8 | 7.8 | 7.8 | 7.8 | 7.8 | 8.0 | 9.0 |
| low fuel consumption performance (index) | 100 | 100 | 110 | 120 | 100 | 100 | 110 | 100 | 110 | 110 | 100 | 100 |
| noise performance (index) | 100 | 120 | 115 | 110 | 120 | 130 | 120 | 125 | 120 | 120 | 125 | 125 |
| overall performance (index) | 200 | 220 | 225 | 230 | 220 | 230 | 230 | 225 | 230 | 230 | 225 | 225 |

From the test results, in the pneumatic tires of Examples according to the present disclosure, the noise performance was improved while exhibiting the same or better fuel efficiency performance as compared to Reference example, and it was confirmed that, since the overall performance represented by the sum of these was also excellent, both the low fuel consumption performance and the noise performance were achieved.

STATEMENT OF THE PRESENT DISCLOSURE

The present disclosure is as follows:
[Present Disclosure 1]
A pneumatic tire comprising:
a tread portion;
a pair of sidewall portions;
a pair of bead portions;
a carcass extending between the bead portions; and
an inner rubber extending between the bead portions, on the inside of the carcass, wherein
the inner rubber comprises a first portion extending through the tread portion with a first thickness, and a second portion extending through the sidewall portions with a second thickness;
the first thickness is more than the second thickness;
the tread portion has a ground contacting surface between a first tread edge and a second tread edge;
the sidewall portions respectively have outer surfaces extending radially inward from the first tread edge and the second tread edge, respectively;
the ground contacting surface has a tire equator at the central position in the tire axial direction between the first tread edge and the second tread edge; and
the outer surfaces have tire maximum width positions which are the outermost positions in the tire axial direction, wherein
in a meridian cross section of the tire under a normal state in which the tire is mounted on a regular rim, inflated to a normal internal pressure, and loaded with no load, when
a first reference point is defined as an intersection of a bead base line with a straight line extending parallel to the tire radial direction through the tire equator;
a second reference point is defined as an intersection of a straight line extending parallel to the tire axial direction through the tire equator with a straight line extending parallel to the tire radial direction through the tire maximum width position;
a reference line segment is defined as a strain line extending between the first reference point and the second reference point;

a shoulder reference point is defined as an intersection of the reference line segment with the ground contacting surface or the outer surface; and
a shoulder line segment is defined as a straight line connecting between the first reference point and the shoulder reference point, then
the length of the shoulder line segment is in a range from 85.9% to 89.3% of the length of the reference line segment.
[Present Disclosure 2]
The pneumatic tire according to Present Disclosure 1, wherein
an average value of the first thickness is in a range from 1.5 to 3.5 times an average value of the second thickness.
[Present Disclosure 3]
The pneumatic tire according to Present Disclosure 1, wherein
an average value of the first thickness is 2.0 to 4.5 mm.
[Present Disclosure 4]
The pneumatic tire according to Present Disclosure 1, 2 or 3, wherein
in the meridian cross section of the tire,
the ground contacting surface is made up of a plurality of arcs having different radii of curvature, and
the plurality of arcs includes a first arc passing through the tire equator, a second arc adjacent to the first arc on the outer side in the tire axial direction, and a third arc adjacent to the second arc on the outer side in the tire axial direction.
[Present Disclosure 5]
The pneumatic tire according to Present Disclosure 4, wherein
a radius R1 of curvature of the first arc is in a range from 1.85 to 2.00 times a radius R2 of curvature of the second arc.
[Present Disclosure 6]
The pneumatic tire according to Present Disclosure 4, wherein
the radius R2 of curvature of the second arc is in a range from 2.08 to 2.74 times a radius R3 of curvature of the third arc.
[Present Disclosure 7]
The pneumatic tire according to Present Disclosure 1, 2 or 3, wherein
a tread width which is the distance in the tire axial direction between the first tread edge and the second tread edge, is in a range from 74% to 84% of a maximum width which is the distance in the tire axial direction at a maximum tire width position.

[Present Disclosure 8]

The pneumatic tire according to Present Disclosure 1, 2 or 3, wherein
with respect to a shape of a ground contacting surface of the pneumatic tire when the pneumatic tire under the normal state is put on a flat surface at a camber angle of 0 degrees, and is loaded with 70% of a normal load,
a tread shape index F defined as a ratio (L3/L4) of
a length L3 in the tire circumferential direction measured at the tire equator to
a length L4 in the tire circumferential direction measured at a position spaced apart from
the tire equator by 80% of the distance from the tire equator to the first tread edge, is in a range from 1.05 to 1.35.

[Present Disclosure 9]

The pneumatic tire according to any one of Present Disclosures 1 to 8, wherein
the outer surface of at least one of the sidewall portions comprises a serration portion,
the serration portion comprises
a plurality of grooves each extending in a tire radial direction and arranged in the tire circumferential direction, and
a plurality of ridges divided by the plurality of grooves, and
each of the plurality of grooves comprises a radially outer end portion having a depth of 0.2 mm or less.

[Present Disclosure 10]

The pneumatic tire according to Present Disclosure 9, wherein
each of the plurality of grooves comprises a radially inner end portion, and has a depth decreasing from the radially inner end portion to the radially outer end portion.

[Present Disclosure 11]

The pneumatic tire according to any one of Present Disclosures 1 to 10, wherein
the tread portion comprises a tread rubber forming a ground contacting surface, and
a loss tangent tan $\delta 1$ of the first portion at 70 degrees C. is not less than a loss tangent tan $\delta 2$ of the second portion at 70 degrees C., and not more than a loss tangent tan $\delta A$ of the tread rubber at 30 degrees C.

[Present Disclosure 12]

The pneumatic tire according to Present Disclosure 11, wherein
the loss tangent tan $\delta 1$ of the first portion is in a range from 1.0 to 2.0 times the loss tangent tan $\delta 2$ of the second portion.

[Present Disclosure 13]

The pneumatic tire according to Present Disclosure 11 or 12, wherein
the loss tangent tan $\delta 1$ of the first portion is in a range from 0.4 to 0.7 times the loss tangent tan $\delta A$ of the tread rubber.

[Present Disclosure 14]

The pneumatic tire according to any one of Present Disclosures 1 to 13, wherein
the carcass comprises carcass cords having a twist coefficient of 2000 to 2500.

[Present Disclosure 15]

The pneumatic tire according to any one of Present Disclosures 1 to 14, wherein
the carcass has a main portion extending between the bead portions, and a turnup portion connected to the main portion and turned up around a bead core of the bead portion from the inside to the outside in the tire axial direction, and
the turnup portion has a radially outer end positioned radially outside a maximum width position of the main portion.

[Present Disclosure 16]

The pneumatic tire according to Present Disclosure 1, wherein
the outer surface of at least one of the sidewall portions comprises a serration portion,
the serration portion comprises a plurality of grooves each extending in a tire radial direction and arranged in the tire circumferential direction, and a plurality of ridges divided by the plurality of grooves, and
each of the plurality of grooves comprises a radially outer end portion having a depth of 0.2 mm or less,
the tread portion comprises a tread rubber forming the ground contacting surface,
the loss tangent tan $\delta 1$ of the first portion at 70 degrees C. is not less than the loss tangent tan $\delta 2$ of the second portion at 70 degrees C., and not more than the loss tangent tan $\delta A$ of the tread rubber at 30 degrees C., and
the carcass comprises carcass cords having a twist coefficient of 2000 to 2500.

[Present Disclosure 17]

The pneumatic tire according to Present Disclosure 1, wherein
an average value of the first thickness is in a range from 1.5 to 3.5 times an average value of the second thickness;
the average value of the first thickness is in a range from 2.0 to 4.5 mm;
in the meridian cross section of the tire,
the ground contacting surface is made up of a plurality of arcs having different radii of curvature, and
the plurality of arcs includes a first arc passing through the tire equator, a second arc adjacent to the first arc on the outer side in the tire axial direction, and a third arc adjacent to the second arc on the outer side in the tire axial direction;
the radius R1 of curvature of the first arc is in a range from 1.85 to 2.00 times the radius R2 of curvature of the second arc;
the radius R2 of curvature of the second arc is in a range from 2.08 to 2.74 times the radius R3 of curvature of the third arc;
a tread width which is the distance in the tire axial direction between the first tread edge and the second tread edge, is in a range from 74% to 84% of a maximum width which is the distance in the tire axial direction at a maximum tire width position; and
with respect to a shape of a ground contacting surface of the pneumatic tire when the pneumatic tire under the normal state is put on a flat surface at a camber angle of 0 degrees, and is loaded with 70% of a normal load,
a tread shape index F defined as a ratio (L3/L4) of
a length L3 in the tire circumferential direction measured at the tire equator to
a length L4 in the tire circumferential direction measured at a position spaced apart from the tire equator by 80% of the distance from the tire equator to the first tread edge, is in a range from 1.05 to 1.35.

[Present Disclosure 18]

The pneumatic tire according to Present Disclosure 17, wherein
the outer surface of at least one of the sidewall portions comprises a serration portion,
the serration portion comprises
a plurality of grooves each extending in a tire radial direction and arranged in the tire circumferential direction, and
a plurality of ridges divided by the plurality of grooves, and
each of the plurality of grooves comprises a radially outer end portion having a depth of 0.2 mm or less,

[Present Disclosure 19]

The pneumatic according to Present Disclosure 17, wherein
the tread portion comprises a tread rubber forming the ground contacting surface, and
the loss tangent tan δ1 of the first portion at 70 degrees C. is not less than the loss tangent tan δ2 of the second portion at 70 degrees C., and not more than the loss tangent tan δA of the tread rubber at 30 degrees C.

[Present Disclosure 20]

The pneumatic tire according to Present Disclosure 17, wherein
the carcass comprises carcass cords having a twist coefficient of 2000 to 2500.

DESCRIPTION OF THE REFERENCE SIGNS 1 pneumatic tire
2 tread portion
2s ground contacting surface
3 sidewall portion
3s outer surface
4 bead portion
6 carcass
10 inner rubber
11 first portion
12 second portion

The invention claimed is:
1. A pneumatic tire comprising:
a tread portion;
a pair of sidewall portions;
a pair of bead portions;
a carcass extending between the bead portions; and
an inner rubber extending between the bead portions, on the inside of the carcass, wherein
the inner rubber comprises a first portion extending through the tread portion with a first thickness, and a second portion extending through the sidewall portions with a second thickness;
the first thickness is more than the second thickness;
the tread portion has a ground contacting surface between a first tread edge and a second tread edge;
the sidewall portions respectively have outer surfaces extending radially inward from the first tread edge and the second tread edge, respectively;
the ground contacting surface has a tire equator at the central position in the tire axial direction between the first tread edge and the second tread edge; and
the outer surfaces have tire maximum width positions which are the outermost positions in the tire axial direction,
wherein
in a meridian cross section of the tire under a normal state in which the tire is mounted on a regular rim, inflated to a normal internal pressure, and loaded with no load, when
a first reference point is defined as an intersection of a bead base line with a straight line extending parallel to the tire radial direction through the tire equator;
a second reference point is defined as an intersection of a straight line extending parallel to the tire axial direction through the tire equator with a straight line extending parallel to the tire radial direction through the tire maximum width position;
a reference line segment is defined as a strain line extending between the first reference point and the second reference point;
a shoulder reference point is defined as an intersection of the reference line segment with the ground contacting surface or the outer surface; and
a shoulder line segment is defined as a straight line connecting between the first reference point and the shoulder reference point,
then
the length of the shoulder line segment is in a range from 85.9% to 89.3% of the length of the reference line segment.

2. The pneumatic tire according to claim 1, wherein an average value of the first thickness is in a range from 1.5 to 3.5 times an average value of the second thickness.

3. The pneumatic tire according to claim 1, wherein an average value of the first thickness is 2.0 to 4.5 mm.

4. The pneumatic tire according to claim 1, wherein in the meridian cross section of the tire,
the ground contacting surface is made up of a plurality of arcs having different radii of curvature, and
the plurality of arcs includes a first arc passing through the tire equator, a second arc adjacent to the first arc on the outer side in the tire axial direction, and a third arc adjacent to the second arc on the outer side in the tire axial direction.

5. The pneumatic tire according to claim 4, wherein a radius R1 of curvature of the first arc is in a range from 1.85 to 2.00 times a radius R2 of curvature of the second arc.

6. The pneumatic tire according to claim 4, wherein the radius R2 of curvature of the second arc is in a range from 2.08 to 2.74 times a radius R3 of curvature of the third arc.

7. The pneumatic tire according to claim 1, wherein a tread width which is the distance in the tire axial direction between the first tread edge and the second tread edge, is in a range from 74% to 84% of a maximum width which is the distance in the tire axial direction at a maximum tire width position.

8. The pneumatic tire according to claim 1, wherein with respect to a shape of a ground contacting surface of the pneumatic tire when the pneumatic tire under the normal state is put on a flat surface at a camber angle of 0 degrees, and is loaded with 70% of a normal load,
a tread shape index F defined as a ratio (L3/L4) of
a length L3 in the tire circumferential direction measured at the tire equator to
a length L4 in the tire circumferential direction measured at a position spaced apart from the tire equator by 80% of the distance from the tire equator to the first tread edge, is in a range from 1.05 to 1.35.

9. The pneumatic tire according to claim 1, wherein
the outer surface of at least one of the sidewall portions comprises a serration portion,
the serration portion comprises
a plurality of grooves each extending in a tire radial direction and arranged in the tire circumferential direction, and
a plurality of ridges divided by the plurality of grooves, and
each of the plurality of grooves comprises a radially outer end portion having a depth of 0.2 mm or less.

10. The pneumatic tire according to claim 9, wherein
each of the plurality of grooves comprises a radially inner end portion, and has a depth decreasing from the radially inner end portion to the radially outer end portion.

11. The pneumatic tire according to claim 1, wherein
the tread portion comprises a tread rubber forming a ground contacting surface, and
a loss tangent tan $\delta 1$ of the first portion at 70 degrees C. is not less than a loss tangent tan $\delta 2$ of the second portion at 70 degrees C., and not more than a loss tangent tan $\delta A$ of the tread rubber at 30 degrees C.

12. The pneumatic tire according to claim 11, wherein
the loss tangent tan $\delta 1$ of the first portion is in a range from 1.0 to 2.0 times the loss tangent tan $\delta 2$ of the second portion.

13. The pneumatic tire according to claim 11, wherein
the loss tangent tan $\delta 1$ of the first portion is in a range from 0.4 to 0.7 times the loss tangent tan $\delta A$ of the tread rubber.

14. The pneumatic tire according to claim 1, wherein
the carcass comprises carcass cords having a twist coefficient of 2000 to 2500.

15. The pneumatic tire according to claim 14, wherein
the carcass has a main portion extending between the bead portions, and a turnup portion connected to the main portion and turned up around a bead core of the bead portion from the inside to the outside in the tire axial direction, and
the turnup portion has a radially outer end positioned radially outside a maximum width position of the main portion.

16. The pneumatic tire according to claim 1, wherein
the outer surface of at least one of the sidewall portions comprises a serration portion,
the serration portion comprises
a plurality of grooves each extending in a tire radial direction and arranged in the tire circumferential direction, and
a plurality of ridges divided by the plurality of grooves, and
each of the plurality of grooves comprises a radially outer end portion having a depth of 0.2 mm or less,
the tread portion comprises a tread rubber forming the ground contacting surface,
the loss tangent tan $\delta 1$ of the first portion at 70 degrees C. is not less than the loss tangent tan $\delta 2$ of the second portion at 70 degrees C., and not more than the loss tangent tan $\delta A$ of the tread rubber at 30 degrees C., and
the carcass comprises carcass cords having a twist coefficient of 2000 to 2500.

17. The pneumatic tire according to claim 1, wherein
an average value of the first thickness is in a range from 1.5 to 3.5 times an average value of the second thickness;
the average value of the first thickness is in a range from 2.0 to 4.5 mm;
in the meridian cross section of the tire,
the ground contacting surface is made up of a plurality of arcs having different radii of curvature, and
the plurality of arcs includes a first arc passing through the tire equator, a second arc adjacent to the first arc on the outer side in the tire axial direction, and a third arc adjacent to the second arc on the outer side in the tire axial direction;
the radius R1 of curvature of the first arc is in a range from 1.85 to 2.00 times the radius R2 of curvature of the second arc;
the radius R2 of curvature of the second arc is in a range from 2.08 to 2.74 times the radius R3 of curvature of the third arc;
a tread width which is the distance in the tire axial direction between the first tread edge and the second tread edge, is in a range from 74% to 84% of a maximum width which is the distance in the tire axial direction at a maximum tire width position; and
with respect to a shape of a ground contacting surface of the pneumatic tire when the pneumatic tire under the normal state is put on a flat surface at a camber angle of 0 degrees, and is loaded with 70% of a normal load,
a tread shape index F defined as a ratio (L3/L4) of
a length L3 in the tire circumferential direction measured at the tire equator to
a length L4 in the tire circumferential direction measured at a position spaced apart from the tire equator by 80% of the distance from the tire equator to the first tread edge, is in a range from 1.05 to 1.35.

18. The pneumatic tire according to claim 17, wherein
the outer surface of at least one of the sidewall portions comprises a serration portion,
the serration portion comprises
a plurality of grooves each extending in a tire radial direction and arranged in the tire circumferential direction, and
a plurality of ridges divided by the plurality of grooves, and
each of the plurality of grooves comprises a radially outer end portion having a depth of 0.2 mm or less.

19. The pneumatic according to claim 17, wherein
the tread portion comprises a tread rubber forming the ground contacting surface, and
the loss tangent tan $\delta 1$ of the first portion at 70 degrees C. is not less than the loss tangent tan $\delta 2$ of the second portion at 70 degrees C., and not more than the loss tangent tan $\delta A$ of the tread rubber at 30 degrees C.

20. The pneumatic tire according to claim 17, wherein
the carcass comprises carcass cords having a twist coefficient of 2000 to 2500.

* * * * *